United States Patent
Tanaka et al.

[19]

[11] Patent Number: 5,944,504
[45] Date of Patent: *Aug. 31, 1999

[54] COMBUSTION METHOD OF INDUSTRIAL COMBUSTION SYSTEM

[75] Inventors: Ryoichi Tanaka, Tokyo; Mamoru Matsuo, Zama, both of Japan

[73] Assignee: Nippon Furnace Kogyo Kaisha, Ltd., Kanagawa-ken, Japan

[ * ] Notice: This patent is subject to a terminal disclaimer.

[21] Appl. No.: 08/888,016

[22] Filed: Jul. 3, 1997

Related U.S. Application Data

[63] Continuation-in-part of application No. 08/548,694, Oct. 26, 1995, Pat. No. 5,695,002, which is a continuation of application No. 08/182,829, Jan. 19, 1994, abandoned.

[30] Foreign Application Priority Data

Jan. 19, 1993 [JP] Japan .......................................... 5-6911

[51] Int. Cl.$^6$ .................................................... F23L 15/00
[52] U.S. Cl. .................................... 431/11; 165/10; 165/4
[58] Field of Search .............................. 165/10, 8, 6, 9.4, 165/9.1, 4; 431/11; 126/91 A

[56] References Cited

U.S. PATENT DOCUMENTS 5,695,002 12/1997 Tanaka et al. ............................. 165/10

*Primary Examiner*—Christopher Atkinson
*Attorney, Agent, or Firm*—Thelen Reid & Priest LLP

[57] ABSTRACT

A combustion method in an industrial combustion system is provided, in which a low temperature combustion air to be fed to a combustion zone of the combustion system is preheated through a high-cycle regenerative combustion system. The high-cycle regenerative combustion system includes a pair of regenerators of honeycomb structure having a plurality of fluid passages defined by honeycomb walls thereof. Either of the combustion air and an exhaust gas generated in the combustion zone is adapted to selectively flow through the fluid passages, and the high-cycle regenerative combustion system has a switching cycle time set to be 60 seconds at the longest, so that the regenerator is alternately in heat-transferable contact with the combustion air flow and the exhaust gas flow to perform heat exchange therebetween. The regenerator has a temperature efficiency greater than 0.7 and the combustion air flow is preheated by the exhaust gas through the regenerator in the high temperature efficiency, whereby the combustion air is continuously preheated up to a temperature range above 800° C. The high temperature air flow is continuously introduced into the combustion zone and a combustion fuel is fed to the air flow, so that a combustion reaction is generated and maintained in the combustion zone by the preheated air flow and the combustion fuel.

13 Claims, 25 Drawing Sheets

COMBUSTION METHOD OF INDUSTRIAL COMBUSTION SYSTEM

This is a continuation-in-part of U.S. application Ser. No. 08/548,694, filed Oct. 26, 1995, now U.S. Pat. No. 5,695,002, which is a continuation application of U.S. application Ser. No. 08/182,829, filed Jan. 19, 1994, now abandoned.

BACKGROUND OF THE INVENTION

The present invention relates to a combustion method in an industrial combustion system and, more particularly, to such a combustion method in which a combustion air to be fed to the combustion device is preheated by a high-cycle regenerative combustion system, so that the preheated combustion air is introduced into a combustion zone to generate and maintain a combustion reaction by means of the high temperature combustion air and a combustion fuel.

A regenerative combustion system has been known that has a combustor and a heat exchanger for heat recovery. Such a heat exchanger is brought into contact with a low temperature fluid which is combustion air, fuel gas or a mixture of the combustion air and the fuel gas, and a high temperature fluid which is exhaust gas generated through the combustion, such as flue gas, burnt gas or combustion gas. The heat energy possessed by the high temperature fluid is accumulated in the heat exchanger and transferred to the low temperature fluid. This type of heat exchangers can be practically used in a variety of plants or industrial furnaces such as a hot air oven for a blast furnace, a coke oven, and a glass melting furnace.

Such a combustion system may have, for example, a pair of burners which constitute a combustor, and a first regenerative heat exchanger and a second regenerative heat exchanger which are disposed in the respective combustion air introduction passages leading to the respective burners. The burners are switched to operate alternately and periodically at a predetermined cycle time such that, when the first burner operates to burn a fuel, the exhaust gas generated as a result of the burning is discharged through the other combustion air introduction passage associated with the second burner. Consequently, the heat energy of the hot exhaust gas is accumulated and conserved in the second heat exchanger as a result of exchange of heat between the exhaust gas and the second heat exchanger. The combustor is then switched so that the second burner is put into operation. During the operation of the second burner, combustion air is supplied through the second heat exchanger, which has been already heated, so as to be pre-heated before reaching the second burner.

In the known switching heat-regenerative combustion system, the cycle time at which the burners are switched is set to be a very long time, which impracticably lowers and degrades a temperature efficiency and a heat recovery efficiency. Further, the whole apparatus including the heat exchangers has to have a large scale in order to realize a great heat accumulation capacity. Under this circumstance, a system generally referred to as high-cycle regenerative combustion system (HRS) or high-speed switching regenerative combustion system has been proposed in recent years, which system is intended to have an improved temperature efficiency, as well as a reduced size, so as to eliminate the above-described drawbacks of the conventional system.

Meanwhile, the present applicant already has proposed, in the specification of Japanese Patent Application No. 2-415583 (Laid-Open No. 4-251190), a honeycomb type ceramic heat accumulator which serves as a heat-regenerative heat exchanger for use in a high-cycle regenerative combustion system of the kind as mentioned above.

The honeycomb type heat accumulator discussed in the above-mentioned specification has been constructed to meet the following three major design requirements:

(i) To set the net or substantial volume Vc per the apparent or gross volume V of the heat accumulator to be a large value, in order to enhance the heat accumulation capacity.

(ii) To set the heat transmission area At per the apparent volume V of the heat accumulator to be a large value, in order to enhance the heat transmission rate.

(iii) To set the pressure loss $\Delta P$ of the fluid to be a small value.

In addition, the pitch or span of the cell walls and the thickness of the cell wall, i.e., the honeycomb pitch and the honeycomb wall thickness of the heat exchanger, are determined such that the multiplication product of the above-mentioned three factors, i.e., (Vc/V) by (At/V) by ($1/\Delta P$), substantially exhibits a maximum value. At the same time, the ratio P/b between the honeycomb pitch P and the honeycomb wall thickness b is preferably determined so as to range from 5 to 10, more preferably to be 7.5.

However, if an approach is made to attain a high temperature efficiency of a range from 0.7 to 1.0 in a combustion system of a conventional structure, an overall volume or bulk size of its heat exchanger is enlarged in a designed size or an actual size to an extent that it would be inapplicable to a practical use. For this reason, the overall size of the heat exchanger has to be limited to some extent; otherwise, necessary designed components have to be partially eliminated in spite of a degraded heat exchanging ability of the heat exchanger. In any event, the ability of heat exchanger has been limited to an order of approximately 0.6 at the greatest.

Thererfore, the conventional heat exchanger of a relatively low temperature efficiency allows the combustion air at an average ambient temperature around 20° C. to be preheated by means of the sensible heat transferred from the combustion exhaust gas, so that the preheated air flow at a relatively low temperature is fed to a combustion zone in a furnace. In such a conventional arrangement, the normally available temperature of continuously preheated combustion air can be merely set to be 500° C.~600° C. as an upper limit.

Meanwhile, a higher temperature of combustion air leads to a higher temperature in the combustion zone proportionally. In general, it is commonly known that the production rate of combustion products such as nitrogen oxides (NOx) increases as the temperature in the combustion zone rises. Therefore, under the combustion theory conventionally established or its relevant technical knowledge of those skilled in the art, a combustion reaction generated in a high temperature combustion air over 500° C.~600° C. contradicts social requirements for further stringent restrictions on the exhaust emission level of combustion products such as nitrogen oxides (NOx) and an environmental or ecological regulations or standards for cleanness of waste materials or gases. Therefore, such a high temperature combustion condition is considered to be industrially impermissible. Thus, the preheat temperature of combustion air for a combustion system is generally limited to 400° C.~500° C. at the highest, since a combustion air flow of a temperature over 500° C.~600° C. is considered to be inapplicable to an industrial combustion system. Actually, even an effort has not been made yet to research or develop a combustion mode in such a high temperature combustion condition.

As regards an industrial furnace of a type in that a preheated combustion air in a temperature range of 400° C.~600° C. is fed to a combustion system, it is technically confirmed that a flame once created in the combustion zone tends to be extinguished or blown out when the oxygen concentration or density of the combustion air is reduced down to 18% or less. However, it has not been known whether a flame itself can be continuously created and kept in force within a combustion air flow preheated to a temperature range higher than 500° C.~600° C., or whether a combustion reaction itself can be normally maintained in such a condition without flame failure. Further, since the significance or meaning of research or development on such a high temperature combustion condition is not apparent, any substantial research or development has not been conducted yet. Still further, it is considered by those skilled in the art that, even if a flame in the combustion zone can be formed and maintained in such a high temperature air, a relatively large amount of nitrogen oxides (NOx) would be produced as described above, and therefore, that such a combustion mode in a highly preheated air is to be an impractical combustion mode which would be industrially inapplicable in view of the restriction requirements as to exhaust emission level and so forth in recent years.

Such being the case, research or development efforts in recent years are mainly directed to, e.g., improvement of a two-stage combustion method in which combustion air of a relatively low temperature or hydrocarbon fuel is stepwisely fed to a combustion zone.

SUMMARY OF THE INVENTION

An object of the present invention is to provide a combustion method in an industrial combustion system in which a combustion air to be fed to an industrial combustion mechanism can be preheated up to an extremely high temperature by means of a heat transmission action between the combustion air and the combustion exhaust gas, so that an improved combustion mode in an industrial furnace or the like can be effectively practiced by the combustion air of an extremely high temperature above 800° C.~900° C.

The present inventors found out the fact that a practically useful and compact heat exchanger, which can stably effect a high temperature efficiency or heat-exchanger effectiveness in a range of 0.7~1.0, can be provided by a heat accumulator having a honeycomb structure made in accordance with a predetermined condition, and that such a heat exchanger allows a combustion air flow of a temperature higher than 800° C.~900° C. to be continuously fed to a combustion zone, whereby a combustion flame having new characteristics can be stably formed and maintained in the air flow of the extremely high temperature.

According to the present invention, a combustion method in an industrial combustion system is provided in which a low temperature fluid including a combustion air to be fed to a combustion zone of the combustion system is preheated through a high-cycle regenerative combustion system, and the preheated fluid is introduced into the combustion zone to generate and maintain a combustion reaction therein. The high-cycle regenerative combustion system includes a regenerator or heat accumulator having a plurality of fluid passages. Either of the low temperature fluid and a high temperature fluid including the exhaust gas generated in the combustion zone is adapted to selectively flow through the fluid passages, so that the regenerator is alternately in heat-transferable contact with the low temperature fluid and the high temperature fluid to perform heat exchange between the low and high temperature fluids therethrough. The regenerator has a temperature efficiency greater than or equal to 0.7 so as to accumulate the sensible heat of the high temperature fluid and transfer the heat to the low temperature fluid. The low temperature fluid is continuously preheated up to a temperature range above 800° C. by means of the regenerator of the above high temperature efficiency. The preheated fluid flow having the temperature higher than 800° C. is continuously introduced into the combustion zone through the regenerator, and a combustion fuel is fed to the fluid flow, so that a combustion reaction is generated and maintained in the combustion zone by the fluid flow and the combustion fuel.

From another aspect of the present invention, a combustion air to be fed to a combustion device is preheated through a high-cycle regenerative combustion system, and the preheated combustion air is introduced into a combustion zone in which a combustion reaction is generated and maintained by the preheated combustion air without flame failure. The high-cycle regenerative combustion system includes a pair of regenerators of a honeycomb structure having honeycomb walls and a plurality of fluid passages defined by the honeycomb walls. Either of the combustion air and combustion exhaust gas is allowed to selectively flow through the fluid passages. A switching cycle time of the combustion system is set to be 60 seconds at the longest. The combustion air of a low temperature to be fed to the combustion zone of the combustion system and a combustion exhaust gas emitted from the combustion zone alternatively flow through the fluid passages in accord with the above switching cycle time. The combustion exhaust gas heats the regenerator whereas the combustion air cools the regenerator, so that the combustion air is preheated by a heat exchange action with the exhaust gas through the honeycomb walls. The temperature efficiency of the regenerator indicates a value ranging from 0.7 to 1.0 and the regenerator provides a heat exchanging action between the exhaust gas and the combustion air in accordance with the high temperature efficiency, so that the regenerator accumulates the sensible heat possessed by the exhaust gas and the heat accumulated by the regenerator is transferred to the combustion air of low temperature. Thus, the combustion air is heated up to an extremely high temperature higher than 800° C. by means of the heat exchanging action with the exhaust gas through the regenerator, and the combustion air flow heated to 800° C. or higher is introduced to the combustion zone. A combustion fuel is fed to the high temperature combustion air flow, so that a combustion reaction is generated and maintained in the combustion zone by the combustion air and the fuel.

In accordance with the above arrangements, a combustion exhaust gas emitted from a combustion zone or a combustion furnace passes through the honeycomb type regenerator of the above high temperature efficiency in a range from 0.7 to 1.0. Generally, the exhaust gas has a temperature ranging from 1,000° C.~1,600° C. The sensible heat possessed by the exhaust gas is heat-transferred to the regenerator and is accumulated therein, whereas the combustion air of a low temperature receives the sensible heat by a heat-transferable contact with the heated regenerator. The combustion air alternately passes through the regenerator or heat exchanger of honeycomb structure so as to be continuously heated up to an extremely high temperature. The temperature of the combustion air thus heated exceeds 700° C. and reaches the temperature range above 800° C. as is apparent from the following formula:

temperature efficiency (ηt)
=(low temperature fluid outlet temperature Tco–low temperature fluid inlet temperature Tci)
/ (high temperature fluid inlet temperature Thi–low temperature fluid inlet temperature Tci)
=(combustion air outlet temperature Tco–average ambient temperature 20° C.)
/ (combustion exhaust gas temperature 1000~1600° C.–average ambient temperature 20° C.)
=0.7~1.0
the combustion air outlet temperature Tco = 706~1600° C.

Further, according to the present invention, the above temperature efficiency of the regenerator is arranged to indicate at least 0.9 in the above combustion method, so that the regenerator continuously heats the combustion air to a high temperature exceeding 900° C. and reaching a temperature range above 950° C., as is apparent from the following formula;

temperature efficiency (ηt)
=(low temperature fluid outlet temperature Tco–low temperature fluid inlet temperature Tci)
/ (high temperature fluid inlet temperature Thi–low temperature fluid inlet temperature Tci)
=(combustion air outlet temperature Tco–average ambient temperature 20° C.)
/ (combustion exhaust gas temperature 1000~1600° C.–average ambient temperature 20° C.)
=0.9~1.0
the combustion air outlet temperature Tco = 902~1600° C.

According to such an arrangement of the present invention, the regenerator having the temperature efficiency of at least 0.9 allows the combustion air to be continuously preheated to a high temperature exceeding 900° C. and reaching a temperature range above 950° C.

It is found that a flame generated in the extremely high temperature preheated air flow above 800° C., especially, above 950° C., can realize a stable combustion reaction in the combustion zone in a very wide range of air ratio. Lower air ratio allows the production rate of combustion products, such as nitrogen oxides (NOx), to be reduced.

The flame stability in such a combustion mode with use of the extremely high temperature combustion air is considered to be derived from the phenomenon in that the nature of combustion flame entirely differs from that of the conventional flame in a reaction velocity or the like, the reaction velocity being effectively increased by the extremely high temperature combustion atmosphere. In addition, the combustion air is heated up to the temperature higher than the self-ignition temperature of the fuel supplied to the combustion zone by a burner, and therefore, an ignition action can be spontaneously induced without external ignition means.

Further, the fluid flow rate or a feeding velocity of the combustion air can be substantially increased, e.g., up to an air flow velocity not less than 80 meters per a second (m/s), while the combustion air can be fed to an ignition area or a combustion zone without extinguishing the flame. This contrasts with the conventional combustion theory in that the combustion air conventionally preheated to the temperature range of 200° C.~400° C. can not be logically and practically increased in its flow velocity to the velocity range greater than the normal limitation for preventing the flame failure.

Such a high flow rate of the combustion air flow activates the combustion gas circulation, especially, the circulation of the combustion gas in the combustion zone or the furnace area, so that a temperature distribution therein is improved to provide an effective combustion condition. Also, it is found that the production rate of combustion products including nitrogen oxides can be reduced with the reduction of the air ratio or the oxygen concentration in the combustion zone. The fact that the production rate of the nitrogen oxides and the like can be reduced or eliminated to the substantial extent under the combustion condition in the extremely high temperature combustion air is entirely contrary to the above conventional technical knowledge that the concentration of nitrogen oxides and so forth in the combustion exhaust gas is to be increased in relation to the higher combustion air temperature. Further, the combustion air flow at a high velocity allows the combustion air to be diluted by the combustion exhaust gas re-circulated in the combustion zone. This results in reduction of the air ratio or the oxygen concentration of the combustion air involved in the combustion reaction, which leads to the reduction of the production rate of the nitrogen oxides and the like.

Thus, the combustion air can be normally and continuously preheated up to the high temperature range to the extent that the conventional device or method could not preheat the combustion air, and the high temperature combustion air allows the combustion reaction to be continuously generated and maintained, whereby an improved combustion method for industrial combustion system effectively applicable to an industrial furnace or the like can be provided in accordance with the present invention.

The above and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the present invention will be described in detail with reference to the accompanying drawings.

Figure 1:
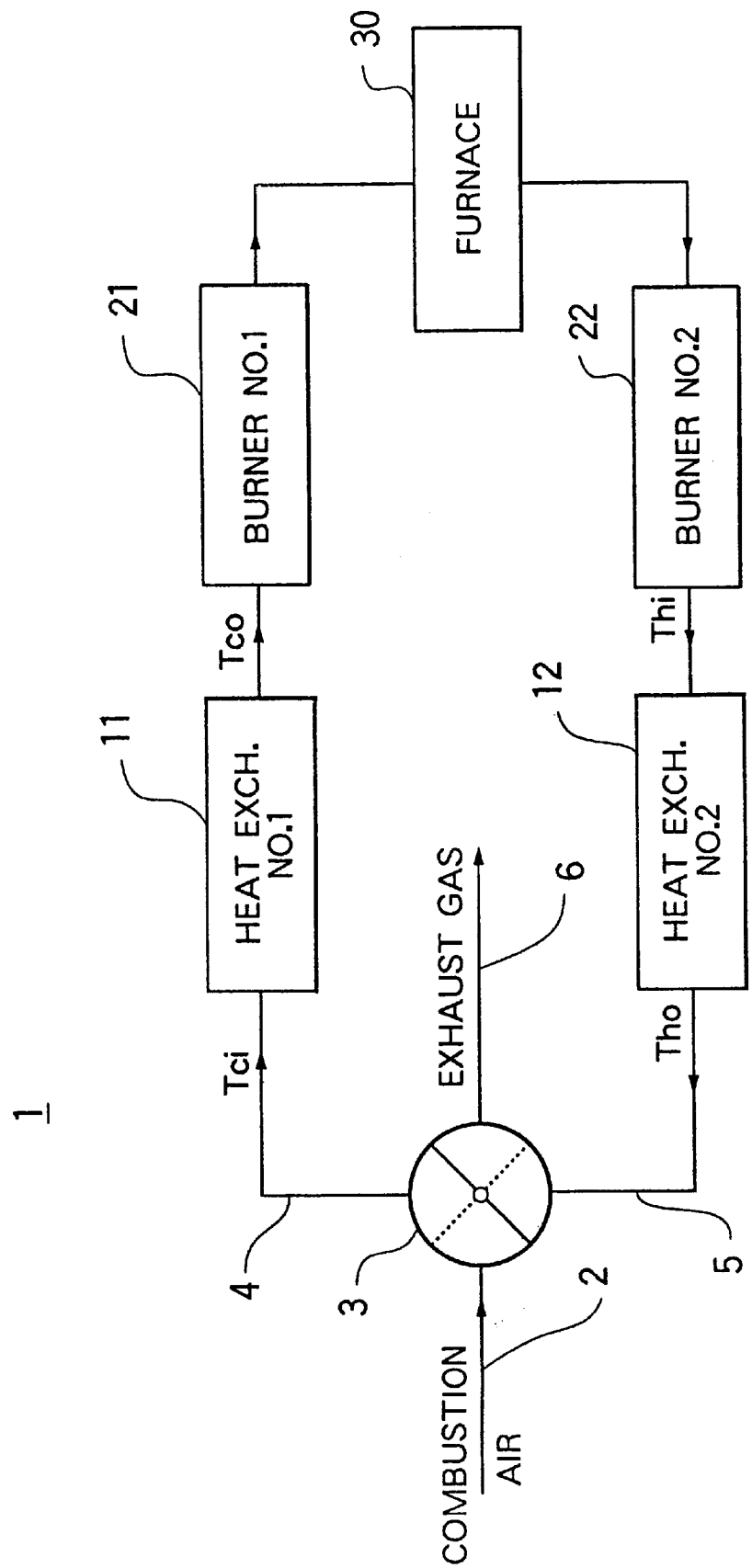
FIG. 1 is a schematic illustration of the whole construction of a high-cycle regenerative combustion system used for a combustion method embodying the present invention.
Figure 2:
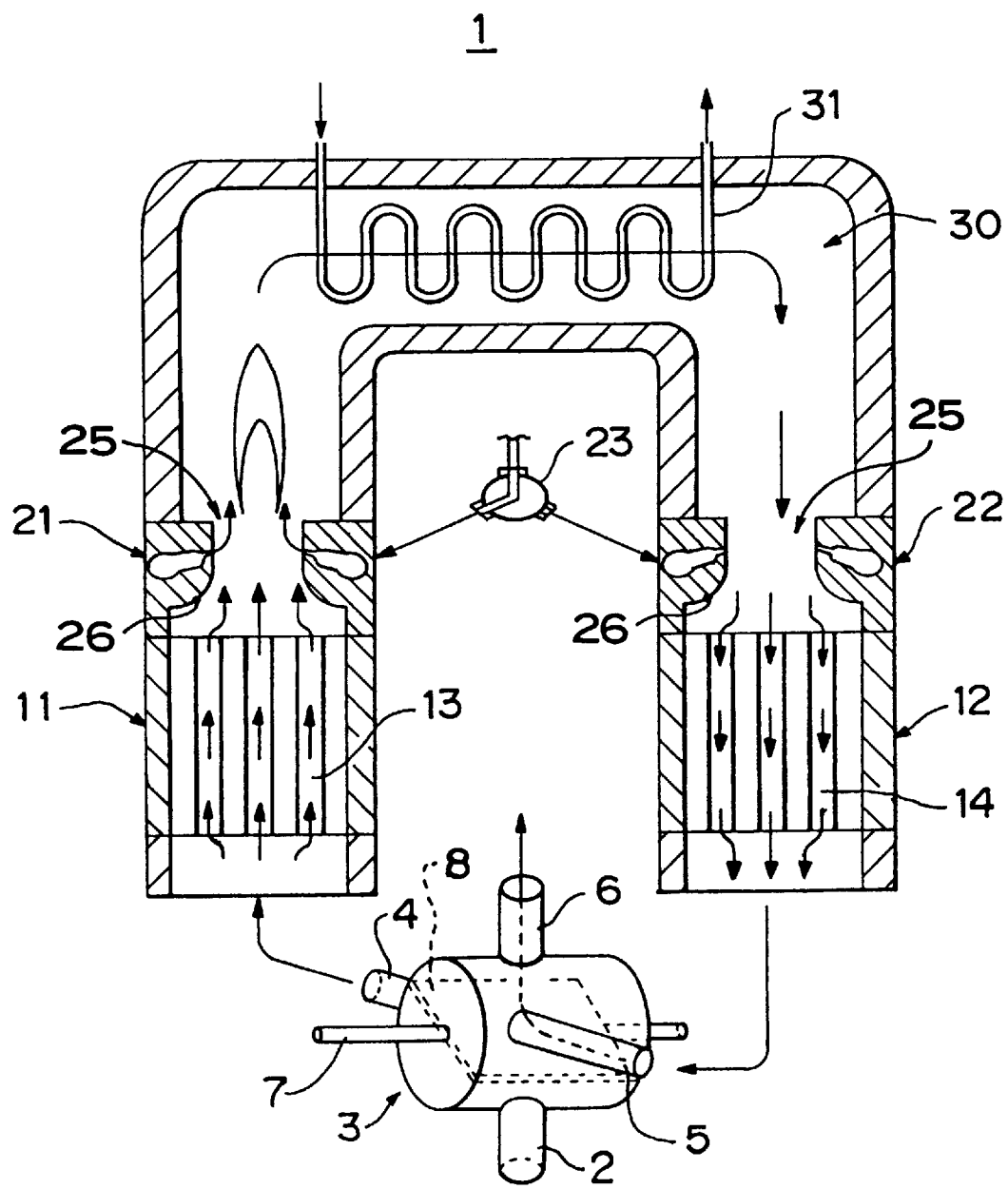
FIG. 2 is a schematic illustration of the construction of the high-cycle regenerative combustion system shown in FIG. 1.

FIG. 1 is a schematic illustration of the whole structure of a high-cycle regenerative combustion system (HRS) incorporating a regenerative heat exchanger or regenerator, which is used for the combustion method in accordance with the present invention, while FIG. 2 is a schematic illustration of the construction of the high-cycle regenerative combustion system shown in FIG. 1.

Referring to FIG. 1, a high-cycle regenerative combustion system 1 (referred to as "combustion system 1" hereinafter) has a combustion air introduction passage 2, first and second regenerative heat exchanger units 11, 12 which are arranged in parallel with each other, first and second burners 21, 22 which are disposed downstream of the heat exchanger units 11, 12 and a combustion furnace 30 which provides a combustion zone for the burners 21, 22. The introduction passage 2 is connected to first and second branch or shunt passages 4, 5 through a four-way valve 3. The first branch passage 4 communicates with the first burner 21 through the first heat exchanger unit 11, while the second branch passage 5 communicates with the second burner 22 through the second heat exchanger unit 12. The four-way valve 3 can be shifted or changed over in such a manner as to selectively provide communication between the introduction passage 2 and either one of the first and second branch passages 4, 5 while providing communication between a exhaust passage 6 and the other of the first and second branch passages 4,5. In FIG. 1, the four-way valve 3 takes a position where it allows the introduction passage 2 to be in communication with the first branch passage 4 while allowing the second branch passage 5 to be in communication with the exhaust passage 6.

Referring now to FIG. 2, the first and second burners 21, 22 are connected to a fuel supply system through a fuel supply valve 23, which is a three-way valve. The fuel supply valve 23 is controlled by a controller (not shown) so as to alternately supply a fuel to one of the first and second burners 21, 22, whereby the first and second burners 21, 22 are alternately put into operation.

Restriction or reduced diameter portions 26 in a form of orifice are disposed in the area between the first heat exchanger unit 11 and the first burner 21 and the area between the second heat exchanger unit 12 and the second burner 22, respectively. The restriction or orifice 26 functions as fluid passage restricting means for restricting the fluid flow passage of the combustion air. The diameter or cross-sectional area of the fuel delivery portion 25 is reduced by the profile of the restriction 26, and the fuel delivery port of the first or second burner 21, 22 opens in the portion 25. Therefore, the high temperature combustion air flowing out of the first or second heat exchanger unit 11, 12 is increased in its velocity as the cross-sectional area of the restriction 26 is reduced, so that the combustion air flows into the combustion zone as a high speed preheated air flow.

The switching between the first and second burners 21, 22 is conducted at a predetermined cycle time which is set to be not longer than 60 seconds. The flame formed on the first or second burner 21, 22 is directed to a heat receptor 31 which is provided in the combustion furnace 30. In the illustrated embodiment, the heat receptor 31 is defined as a heat-transfer coil or heated tube, through which a medium flows to be heated. Each of the first and second burners 21, 22 is provided with attachments or accessories such as a pilot burner, ignition transformer and so forth. Depiction of those attachments or accessories, however, are omitted from the drawings for the purpose of simplification of illustration.

The four-way valve 3 has a plate-like valve body 8 which is fixed to a rotary shaft 7 and the shaft 7 is rotated by a driving device (not shown) so as to switch the position of the valve body 8. The driving device rotates the rotary shaft 7 in synchronization with the switching between the first and second burners 21, 22, so as to hold the valve member 8 at either of first and second positions. In the first position, the valve member 8 allows the first passage 4 to communicate with the introduction passage 2 and the second passages 5 to communicate with the exhaust passage 6, during the operation of the first burner 21, whereas in the second position, the valve member 8 allows the first passages 4 to communicate with the exhaust passage 6 and the second passages 5 to communicate with the introduction passage 2, during the operation of the second burner 22.

When the first burner 21 is in operation, the exhaust gas, flue gas or burnt gas from the combustion furnace 30 is discharged through the second heat exchanger unit 12 so that the waste heat energy of the exhaust gas is accumulated in the second heat exchanger unit 12. In the subsequent phase in which the second burner 22 operates, the accumulated heat is transferred from the second heat exchanger unit 12 to the combustion air introduced through the second branch passage 5, thereby pre-heating the combustion air. Conversely, when the second burner 22 is in operation, the waste heat of the exhaust gas from the furnace 30 is accumulated in the first heat exchanger unit 11. In the subsequent phase in which the first burner 21 operates, the accumulated heat is transmitted form the first heat exchanger unit 11 to the combustion air introduced through the first branch passage 4, thereby pre-heating the combustion air.

In the illustrated embodiment, honeycomb-type ceramics heat accumulators, which is so-called a ceramic regenerator, are used in the first and second heat exchanger units 11, 12. The combustion air and the exhaust gas are caused to flow through a plurality of flow passages or channels 13, 14 formed in the first and second heat exchangers.

Figures 3A, 3B:
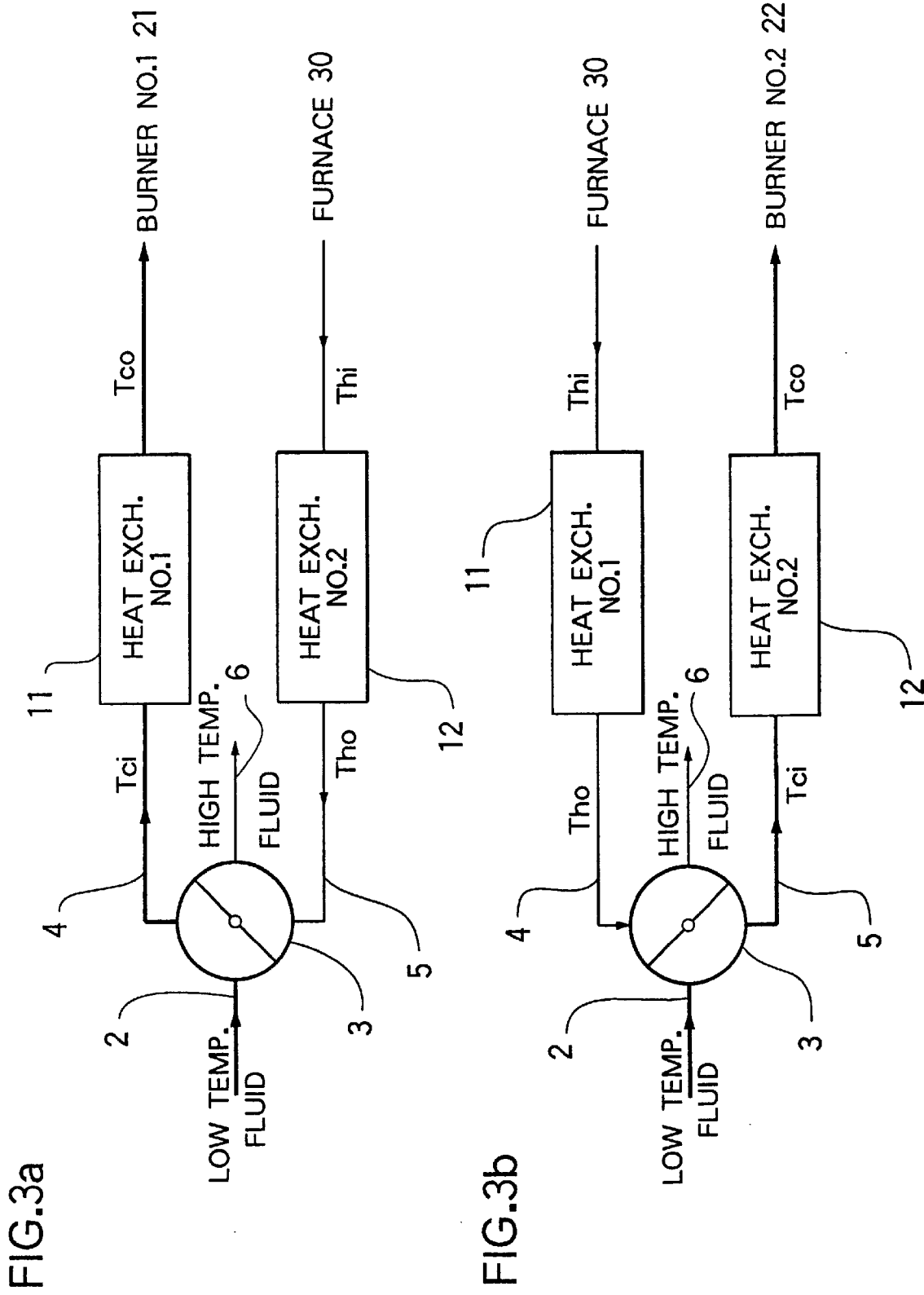
FIGS. 3a and 3b are schematic illustrations of the combination system shown in FIG. 1, illustrative of the paths of combustion air and exhaust gas in a mode in which a four-way valve is in a first position and in another mode in which the four-way valve is in a second position, respectively.
Figure 4A:
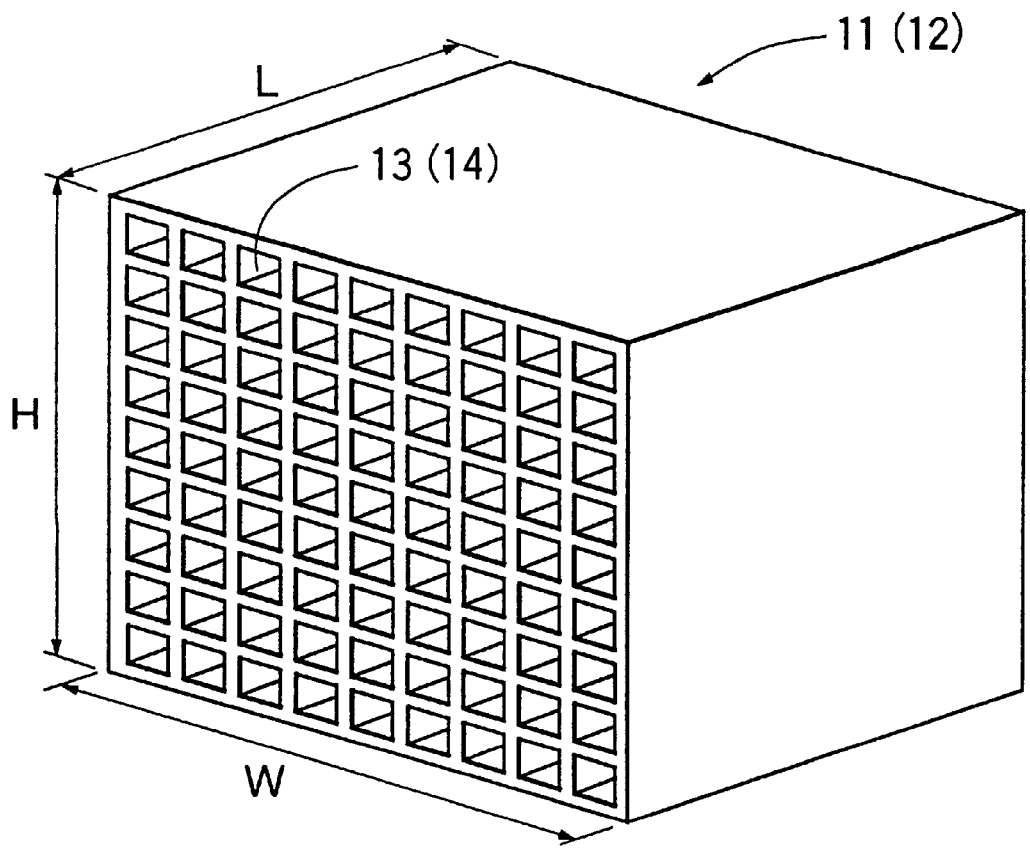
FIGS. 4a and 4b are a perspective view and a fragmentary enlarged perspective view showing the constructions of first and second heat exchangers used in the system shown in FIG. 1.
Figure 4B:
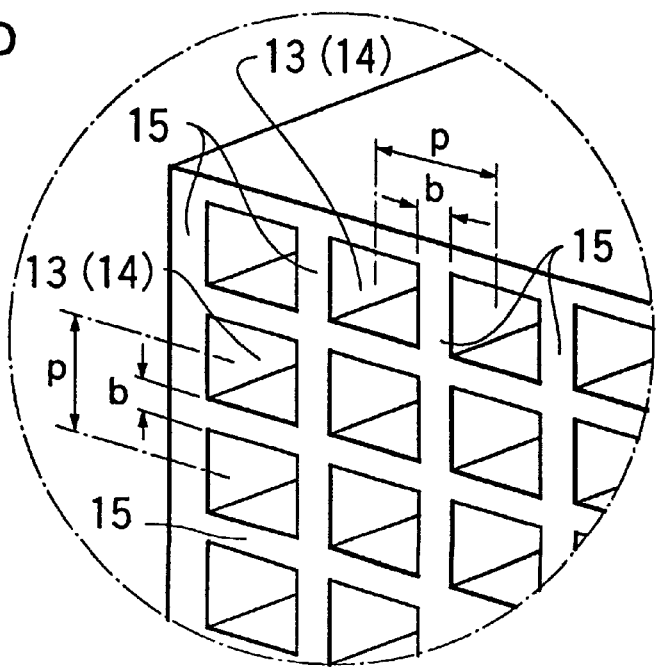

FIG. 3(a) shows a schematic fluid-flow diagram of the combustion air and the exhaust gas when the four-way valve is in the first position, and FIG. 3(b) shows a schematic fluid-flow diagram of the combustion air and the exhaust gas when the four-way valve is in the second position. FIGS. 4(a) and 4(b) are a perspective view and a fragmentary enlarged perspective view showing the construction of each of the first and second heat exchanger units 11, 12.

When the four-way valve is in the first position as shown in FIG. 3(a), combustion air of a relatively low temperature (Tci) through the introduction passage 2 is passed to the first heat exchanger unit 11 through the first branch passage 4 and is brought into contact with the heat transfer surface of the first heat exchanger unit 11 so as to be heated by a heat exchange with the first heat exchanger unit 11. The combustion air thus pre-heated up to a comparatively high temperature (Tco) is fed from the first heat exchanger unit 11 to the first burner 21. The air flow velocity is increased by the reduction of the cross-sectional area in the restriction 26.

Meanwhile, the exhaust gas of high temperature (Thi) from the furnace 30 is caused to pass through the second heat exchanger unit 12 to be brought into contact with the heat transfer surface of the second heat exchanger unit 12, thereby heating the second heat exchanger unit 12 by a heat exchange therebetween. The exhaust gas thus cooled down to a comparatively low temperature (Tho) is then caused to flow through the second branch passage 5 so as to be discharged through the exhaust passage 6.

Then, the four-way valve is switched from the first position to the second position as shown in FIG. 3(b), so that the combustion air of a low temperature (Tci) from the introduction passage 2 is fed through the second branch passage 5 to the second heat exchanger unit 12, which has been heated by the exhaust gas. Therefore, the combustion gas is heated as a result of the heat exchange with the second heat exchanger unit 12, whereby the combustion air is pre-heated up to a relatively high temperature (Tco) to be delivered from the second heat exchanger unit 12 to the second burner 22. The combustion air thus pre-heated up to a comparatively high temperature (Tco) is fed from the first heat exchanger unit 11 to the first burner 21. The air flow velocity is increased by the reducing profile of the restriction 26, when it passes therethrough.

Meanwhile, the exhaust gas of a high temperature (Thi) from the furnace 30 is caused to pass through the first heat exchanger unit 11 so as to heat the first heat exchanger unit 11 through heat exchange therebetween. The exhaust gas thus cooled down to a comparatively low temperature (Tho) is then caused to flow through the first branch passage 4 so as to be discharged via the discharge passage 6.

Thus, the regenerative heat exchangers constituting the heat accumulators or regenerators, i.e., the first and second heat exchanger units 11, 12, are alternately and switchingly brought into heat-transfer contact with a high temperature fluid (exhaust gas) and a low temperature fluid (combustion air) so as to take up the sensible heat from the high temperature fluid and to transfer the sensible heat to the low temperature fluid, thereby performing heat exchange between the high temperature fluid and the low temperature fluid. This kind of heat exchanger having the above described construction, when the cycle time of switching of the fluid passage is set to be a relatively short period of 60 seconds or shorter, theoretically can attain the temperature efficiency or heat-exchanger effectiveness up to a range between 70 to 100%, in contrast to the conventional heat exchangers which could merely provide only a low temperature efficiency or heat-exchanger effectiveness in a range of 60 to 70% at the highest.

As shown in FIGS. 4(a) and 4(b), the width W, the length L and the height H of each of the first and second heat exchanger units 11, 12 are so determined that each heat exchanger unit can be appropriately incorporated in the combustion system 1. The heat exchanger units have lattice-like honeycomb structures with a plurality of flow passages or channels 13, 14 of a square cross-section. The thickness b of the cell wall defining the flow channels 13, 14 and the cell pitch P of the cell walls 15 are set to the following predetermined values, respectively.

In each of the first and second heat exchanger units 11, 12 of the illustrated embodiment, the cell wall thickness b and the cell wall pitch P are determined so that they correspond to a maximum value of a volumetric efficiency and ensure a temperature efficiency within the range of between 0.7 and 1.0. The volumetric efficiency is an index indicative of the heat transmission rate per the volume of the heat accumulator inclusive of the whole cavity volume of the flow channels, and is defined by the following equation:

--- volumetric efficiency (Q/V)
=(heat transmission rate Q (Kcal/h) of heat accumulator)
/(overall volume ($m^3$) of heat accumulator inclusive of volume of flow channels)

---

The volumetric efficiency (Q/V) is an index of the performance of the heat accumulator, which is newly proposed by the present inventors and which is related both to the heat transmission rate Q and the overall volume V of the heat accumulator. This index can be effectively used in substantially improving the temperature efficiency of the heat exchanger while reducing the overall size of the heat exchanger. By determining the cell wall thickness b and the cell wall pitch P under the conditions which maximize the value of the volumetric efficiency, it is possible to improve the temperature efficiency of the heat exchanger while limiting increase in the overall volume of the heat exchanger.

The temperature efficiency or heat-exchanger effectiveness ηt is an index which indicates, in term of fluid temperatures, the ratio of the transferable calorific value possessed by the high temperature fluid to the calorific value received by the low temperature fluid. The temperature efficiency is generally expressed by the following equation:

--- temperature efficiency ($\eta t$) =
(low temperature fluid outlet temperature Tco–low temperature fluid inlet temperature Tci)
/ (high temperature fluid inlet temperature Thi–low temperature fluid inlet temperature Tci)

---

In the combustion system 1 as described above, it is assumed that the low temperature fluid (i.e., the combustion air) and the high temperature fluid (i.e., the exhaust gas) have an equal value of water equivalent and an equal heat transmission coefficient, and the thickness b and the pitch P of the cell walls 15 are set to be values which substantially correspond to the maximum value of the volumetric efficiency determined by the following equation:

$$Q/V = \eta t(Thi-Tci)(1-\epsilon)Cm/\tau \cdot PM_2/PM_1 \tag{1}$$

The temperature efficiency $\eta t$ in the equation (1) is determined by the following equation (2):

$$\eta t = 1/(1+2/PM_1 + \exp(-2PM_1/PM_2)) \tag{2}$$

$PM_1$ and $PM_2$ in the equation (2) are determined as follows:
$PM_1 = hA/Cg\ Gg$
$PM_2 = hA\tau/Cm\ Gm$
where the respective symbols represent the following factors:

---

| | | |
|---|---|---|
| Tci: | inlet temperature of the low temperature fluid | ° C. |
| Thi: | inlet temperature of the high temperature fluid | ° C. |
| $\epsilon$: | void ratio or voidage of the heat accumulator | |
| A: | heat transmission area | m² |
| h: | heat transmission coefficient | Kcal/m² h° C. |
| $\tau$: | switching cycle time | hr |
| Cg: | constant-pressure specific heat of gas | Kcal/m³ N° C. |
| Gg: | flow rate of the fluid | m³N/h |
| Cm: | specific heat of the heat accumulator | Kcal/m³ ° C. |
| Gm: | net volume of the heat accumulator | m³ |

---

The equation (2) has been originally created by the inventors and can suitably be used in calculating the temperature efficiency $\eta t$.

The void ratio $\epsilon$ is the ratio of the volume of the flow channels (volume of voids) in the heat accumulator to the overall volume of the heat accumulator inclusive of the flow channels, and is determined by the following equation:

--- void ratio = flow channel volume (cavity volume)
/ overall volume of heat accumulator

---

In the illustrated embodiment, the void ratio $\epsilon$ is calculated as follows:
void ratio $(\epsilon) = (P-b)^2/P^2$
The ratio of the transmission area (A) to the net volume (Gm) of the heat accumulator is calculated in accordance with the following formula:

$$A/Gm = 4(P-b)/(P^2-(P-b)^2)$$

In the illustrated embodiment, the temperature efficiency $\eta t$ is beforehand set to fall within a range of between 0.7 and 1.0, preferably to 0.9. The combustion air inlet temperature, i.e., the low temperature fluid inlet temperature (Tci) is set at 20° C., while the exhaust gas inlet temperature, i.e., the high temperature fluid inlet temperature (Thi) is set at 1,000° C. As is apparent to those skilled in the art, a combustion exhaust gas generally has a temperature ranging from 1,000° C. to 1,600° C., and the temperature around 1,000° C. substantially corresponds to the minimum temperature, except for a specific type of a combustion furnace in which the temperature of its combustion zone has to be limited or lowered to a relatively low temperature for the purpose of its use.

At the same time, the specific heat Cm of the heat accumulator is set to be a value as shown below. In the illustrated embodiment, the heat accumulators constituting the first and second heat exchangers are assumed to be made of ceramics, and therefore, the value 406 is adopted as the value of the specific heat Cm.

---

| Materials | Specific heat Cm |
|---|---|
| Ceramics | 406 |
| Steel | 860 |

---

As a preferred material of the heat accumulator, a form of cordierite, mullite, silicone carbide, silicon nitride or the like may be employed.

The heat transmission coefficient (h) mentioned above is calculated in accordance with the following equation (3):

$$h = 3.5T^{0.23}Vn^{0.8}/d^{0.2} \tag{3}$$

wherein the respective symbols represent the following factors:

--- d: equivalent diameter (m)
= 4 × (cross-sectional area of flow channel)
/(circumferential length of cross-section of flow channel)
T: mean temperature of fluid (K.)
T = 273 + (Thi + Tci)/2
Vn: fluid flow velocity (mN/s)
converted to values under standard state (0° C., 1 atm)

---

The equation (3) is a specific equation for determining the heat transmission coefficient h and has been found by the inventors through experiments. The flow channel cross-sectional area is the cross-sectional area of each of the flow channels 13, 14 and therefore, can be determined by (pitch P–wall thickness b)². The circumferential length of the flow channel cross-section is the circumferential length of the cross-section of each of the flow channels 13, 14 and therefore, it can be expressed by 4×(Pitch P–Wall thickness b). The equivalent diameter therefore is simply calculated, based on (Pitch P–Wall thickness b).

The pressure loss ($\Delta P/L$) across the flow passage per unit length of the passage is preferably set to fall within the range of between 1,000 and 2,000 mmH$_2$O/m. In the illustrated embodiment, the pressure loss is set to be e.g., 1,500 mmH$_2$O/m, and the flow velocity of the fluid was calculated in accordance with the following equation (4):

$$Vn = \sqrt{(d/1.3 \cdot 2g/\gamma n \cdot 273/T \cdot \Delta P/L)} \quad (4)$$

g: gravitational acceleration     9.8 m/s²

L: length of fluid flow passage     m

γn: specific gravity of the fluid in standard state     Kg/m³N (0° C., 1 atm)

ΔP: pressure loss     mmH₂O

Figure 5:
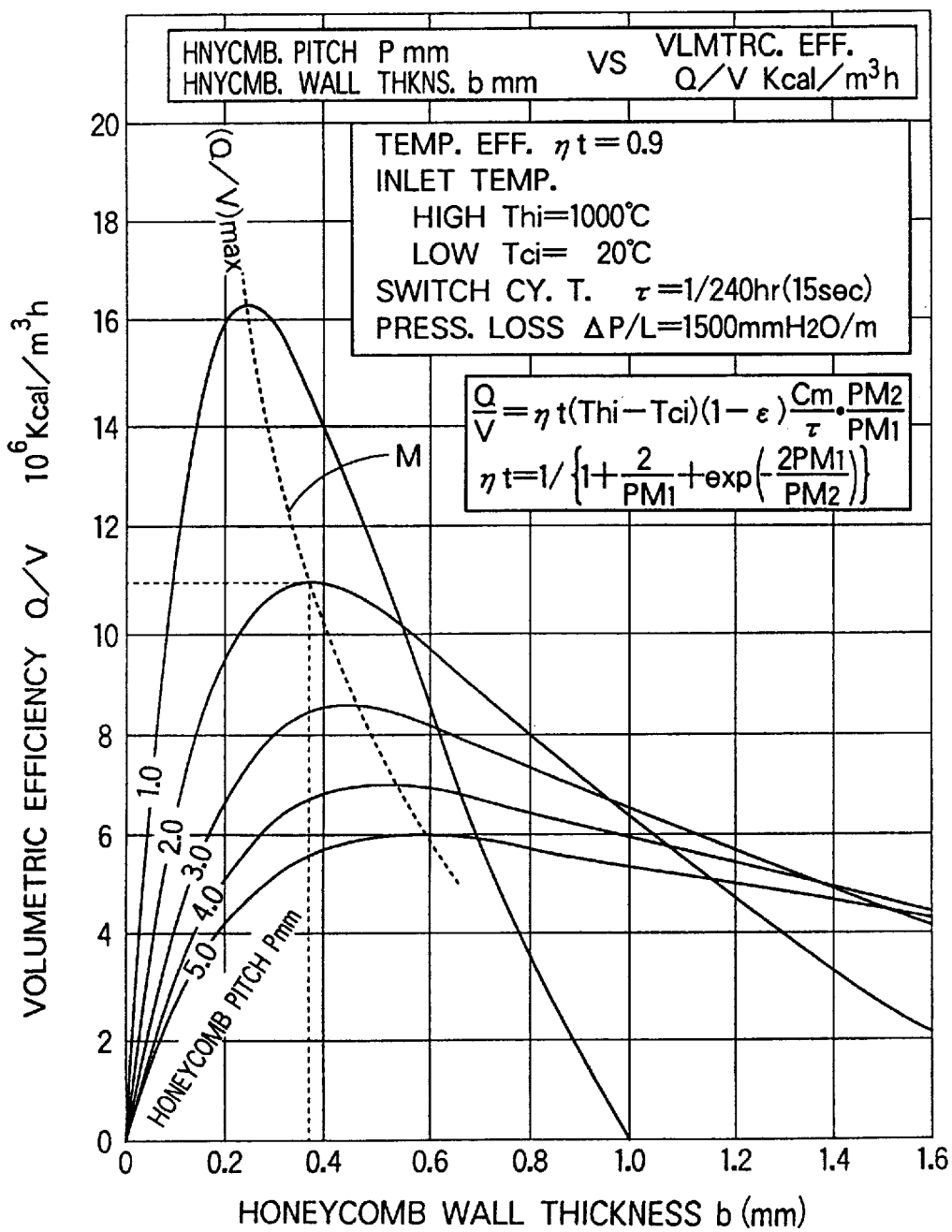
FIGS. 5 to 8 are diagrams showing the values of the volumetric efficiency (Q/V) of the first and second heat exchangers calculated in accordance with equations (1) to (4) as set forth below, with the switching cycle time of the four-way valve set to be 15 seconds, 30 seconds, 45 seconds and 60 seconds, respectively.
Figure 6:
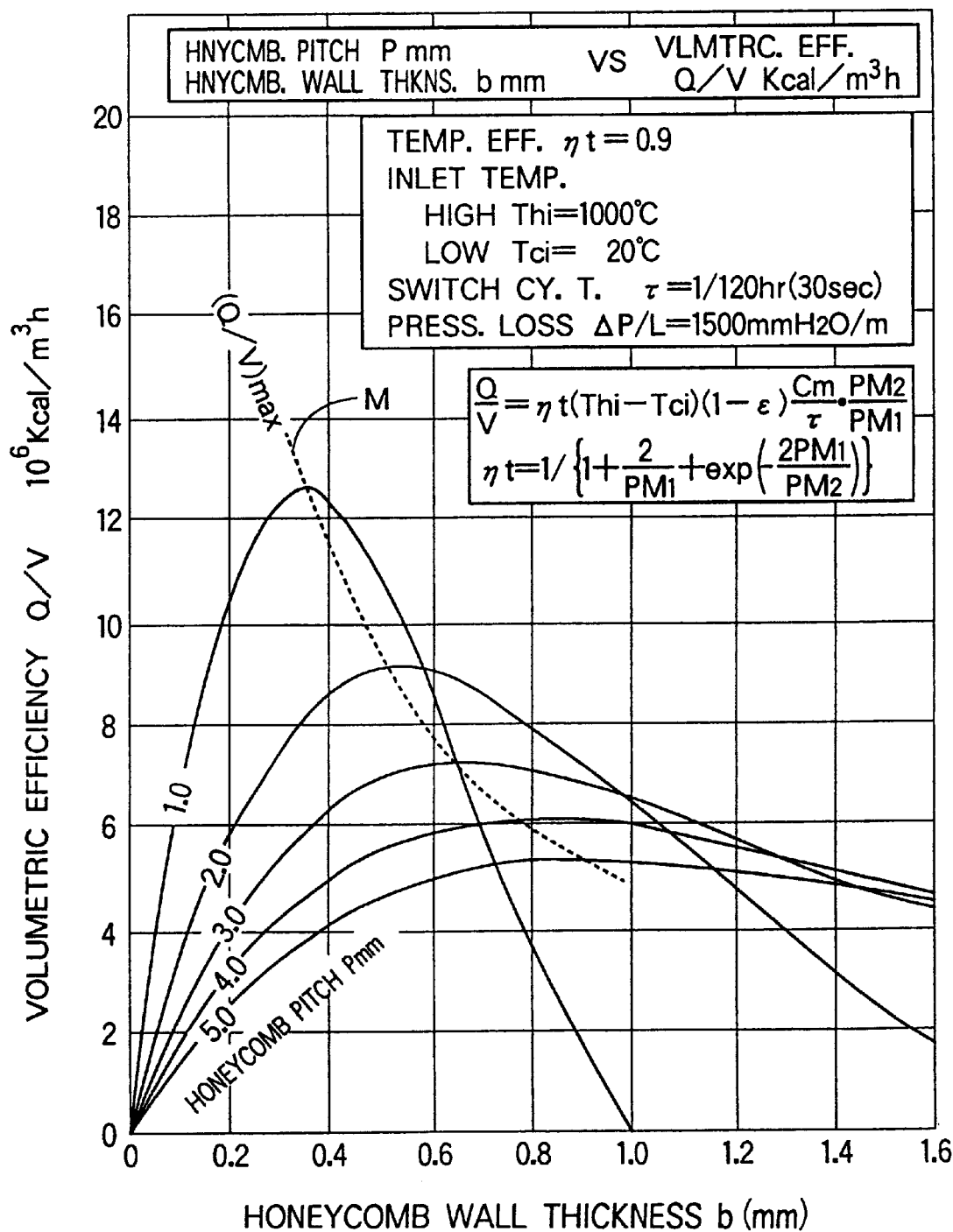
Figure 7:
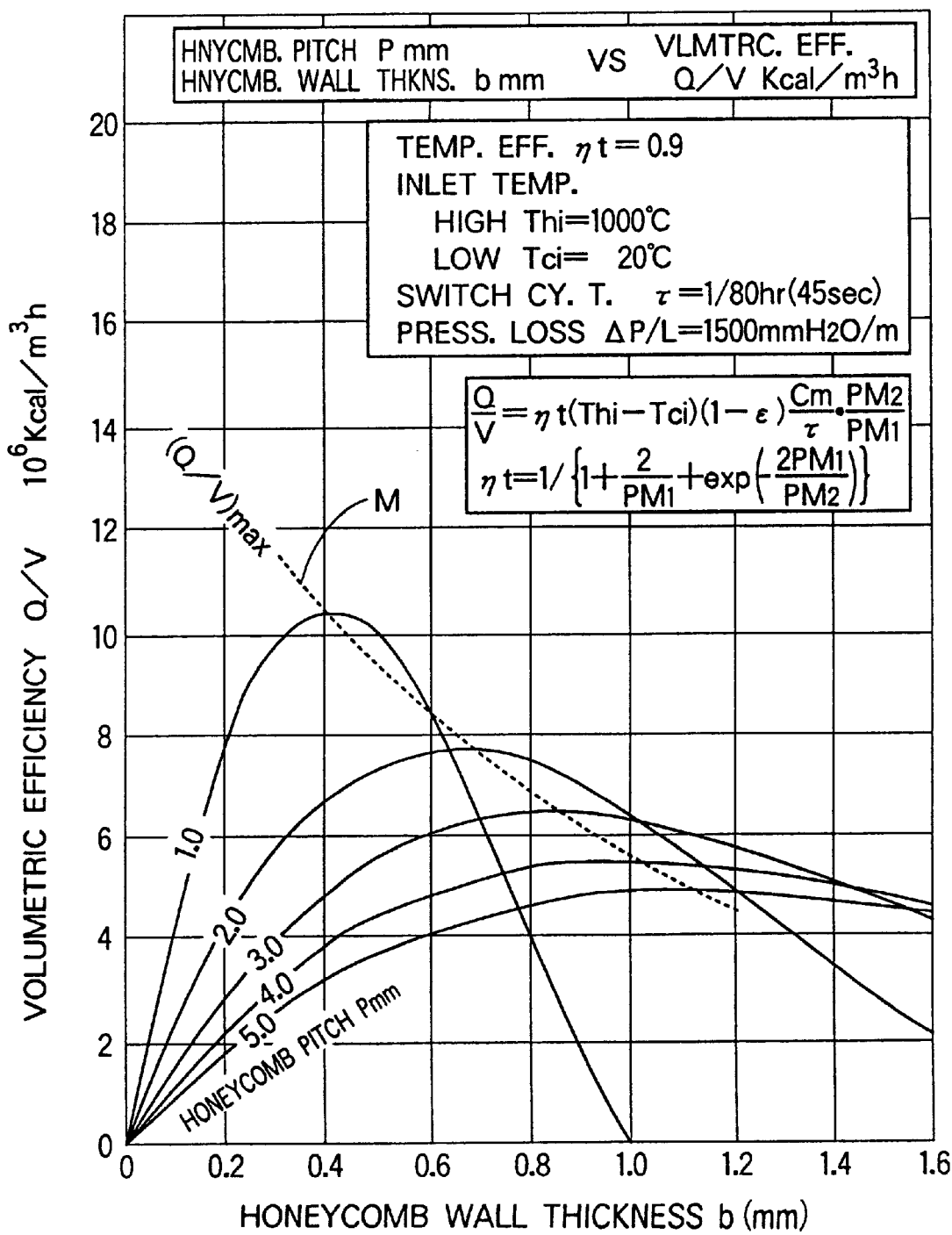
Figure 8:
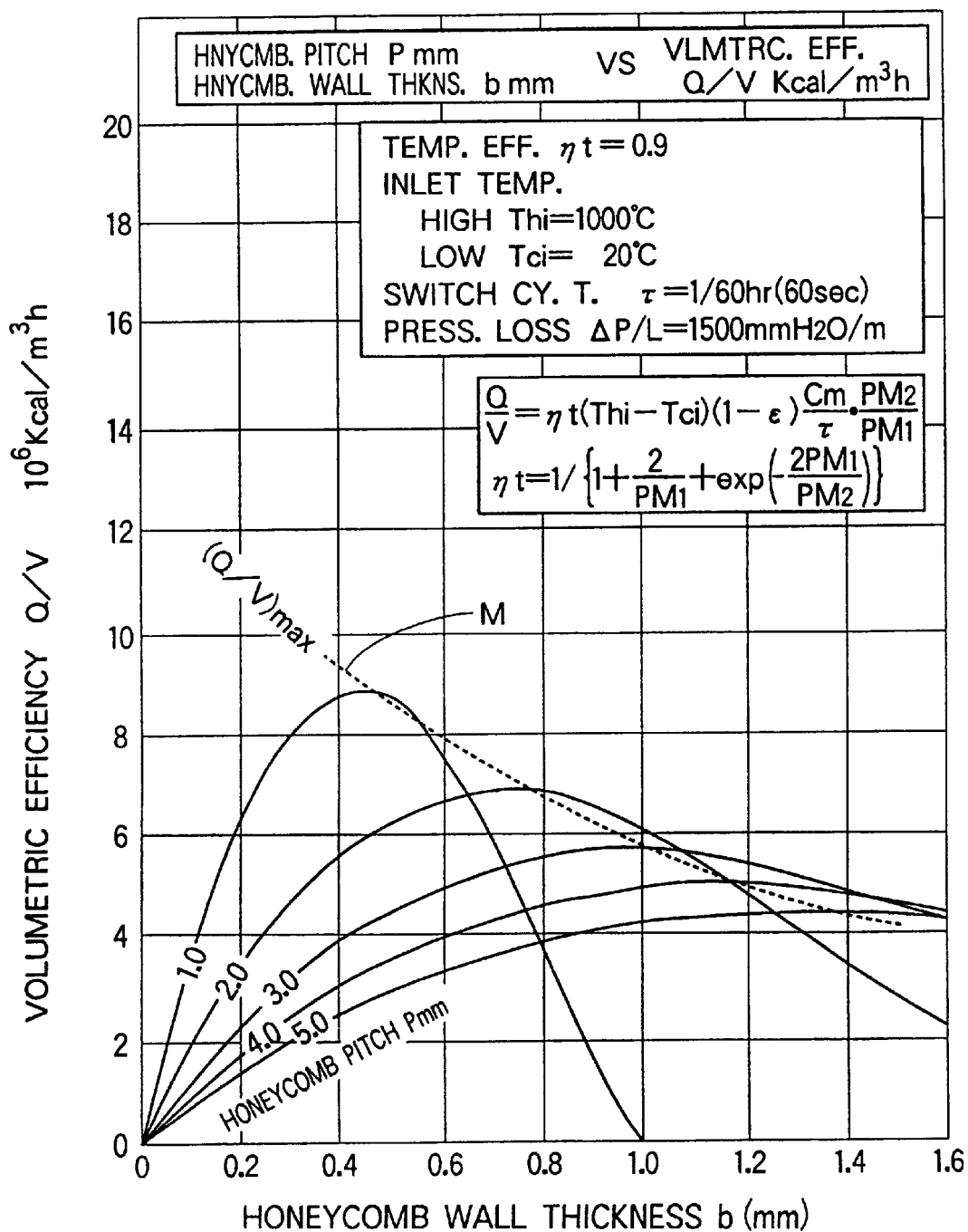

FIGS. 5 to 8 are graphic diagrams showing values of the volumetric efficiency (Q/V) of the first and second heat exchanger units 11, 12 as calculated in accordance with the equations (1) to (4). More specifically, FIG. 5 shows the diagram showing the volumetric efficiency (Q/V) as obtained when the switching cycle time τ of the four-way valve 3 is set to be 15 seconds, while FIGS. 6, 7 and 8, respectively, show the values of volumetric efficiencies (Q/V) as obtained when the switching cycle time τ is set to be 30 seconds, 45 seconds and 60 seconds respectively. These values of volumetric efficiency (Q/V) are calculated on an assumption that the temperature efficiency ηt is 0.9.

In the X-Y coordinate system in each of FIGS. 5 to 8, the X-axis shows the values of the thickness b of the cell walls 15, i.e., the honeycomb wall thickness b, while the Y-axis shows the values of the volumetric efficiency (Q/V). Each of these Figures shows, by way of example, the curves representing the functional relation between the volumetric efficiency (Q/V) and the honeycomb wall thickness b with the honeycomb pitch P as a parameter being varied from a relatively great value (5 mm) to a small value (1 mm) via a plurality of intermediate values (4 mm, 3 mm and 2 mm).

As is apparent from FIGS. 5 to 8 and FIGS. 9 to 20 set forth below, the present inventors conducted research on the heat exchanging ability of ceramic regenerators of honeycomb structures having the honeycomb wall thickness b no greater than or equal to 1.6 mm and the honeycomb pitch P no greater than or equal to 5.0 mm, and studied them carefully. Such a honeycomb type regenerator with narrow passages has been considered to be practically inapplicable to a heat exchanger through which the combustion exhaust gas including foreign materials, sticky components or the like passes, because the flow passages are blocked in a relatively short running time by the components contained in the exhaust gas flow, such as dusts, particles or ashes, which tend to stick or deposit on the honeycomb wall. However, such ceramic regenerators of honeycomb structures can be preferably used in the present invention.

It can be understood from FIGS. 5 to 8, the function curve representing the functional relation between the volumetric efficiency (Q/V) and the honeycomb wall thickness b in each Figure exhibits a maximum or peak value (Q/V)max. Thus, the volumetric efficiency (Q/V) may have a maximum value (Q/V)max at a certain value of the honeycomb wall thickness b with respect to each value of the honeycomb pitch P. The coordinate values of the maximum value (Q/V)max indicate the optimum values of the pitch P and thickness b of the cell walls 15 of each of the first and second heat exchanger units 11, 12 used in the present invention. For instance, the Y-coordinate value of the maximum value point (Q/V)max of the volumetric efficiency (Q/V) for the honeycomb pitch P=2 mm, is located to be approximately 10.9×10⁶ Kcal/m³ N h. At the same time, the X-coordinate value of this maximum value point, i.e., approximately 0.36 mm, is determined as being the optimum value of the cell wall thickness b. Thus, the cell wall pitch P and the cell wall thickness b can be optimally determined to be P=2 mm and b=0.36 mm, respectively, in order to maximize the value of the volumetric efficiency (Q/V).

In each of FIGS. 5 to 8, the coordinate points of the maximum value points (Q/V)max for different values of honeycomb pitches P are interconnected by a broken-line curve M, which can be termed as the maximum volumetric efficiency curve. The coordinate value of the intersection of the maximum volumetric efficiency curve M and the function curve, which represents the functional relationship between the volumetric efficiency (Q/V) and honeycomb wall thickness b for any given value of the honeycomb pitch P, indicates an optimum honeycomb wall thickness b optimum for the value of the pitch P.

As the switching cycle time τ increases in FIGS. 5 to 8, the maximum volumetric efficiency curve M is shifted to the lower zone on the coordinate system, and the maximum point of the volumetric efficiency (Q/V)max is shifted so as to indicate a greater honeycomb wall thickness b. It can be therefore understood that the optimum honeycomb wall thickness b with respect to a predetermined honeycomb pitch P increases in accordance with the increase in the switching cycle time τ. This means that, in order to attain the maximum volumetric efficiency (Q/V) in a longer switching cycle time τ, it is necessary to increase the honeycomb wall thickness b with respect to a predetermined value of the honeycomb pitch P.

FIGS. 9 to 12 are the other graphical diagrams showing the relationship between the honeycomb pitch P and the honeycomb wall thickness b in the first and second heat exchanger units 11, 12, as calculated in accordance with the equations (1) to (4).

More specifically, FIGS. 9 to 12 show X-Y coordinate diagrams in which the X-axis represents the values of the honeycomb pitch P and the Y-axis indicates the honeycomb wall thickness b. In each of these Figures, curves, each of which represents equal value of the volumetric efficiency (Q/V), are shown. Each of the curve is obtained by plotting and interconnecting of coordinate points of the honeycomb pitches P and honeycomb wall thicknesses b which can provide an equal value of the volumetric efficiency (Q/V) as calculated in accordance with the equations (1) to (4). These curves look like contour lines and therefore, are referred to as contour lines hereinafter. Thus, all the coordinate values of the pitch P and wall thickness b on one of the contour lines correspond to an equal value of the volumetric efficiency (Q/V).

Figure 9:
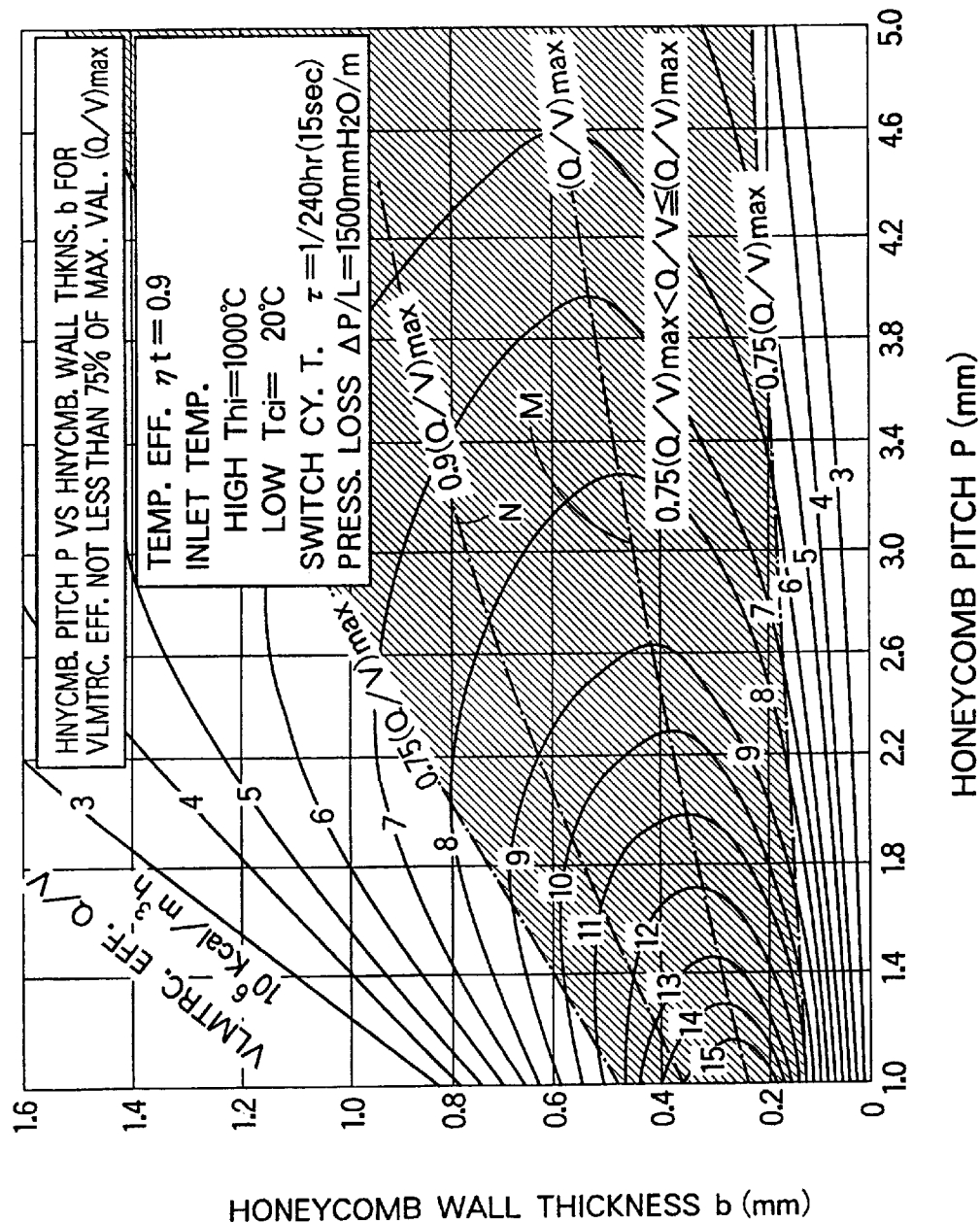
FIGS. 9 to 12 are diagrams showing the relationships between the honeycomb pitch and the honeycomb wall thickness in the first and second heat exchangers as calculated in accordance with the equations (1) to (4), with the switching cycle time of the four-way valve set to be 15 seconds, 30 seconds, 45 seconds and 60 seconds, respectively.
Figure 10:
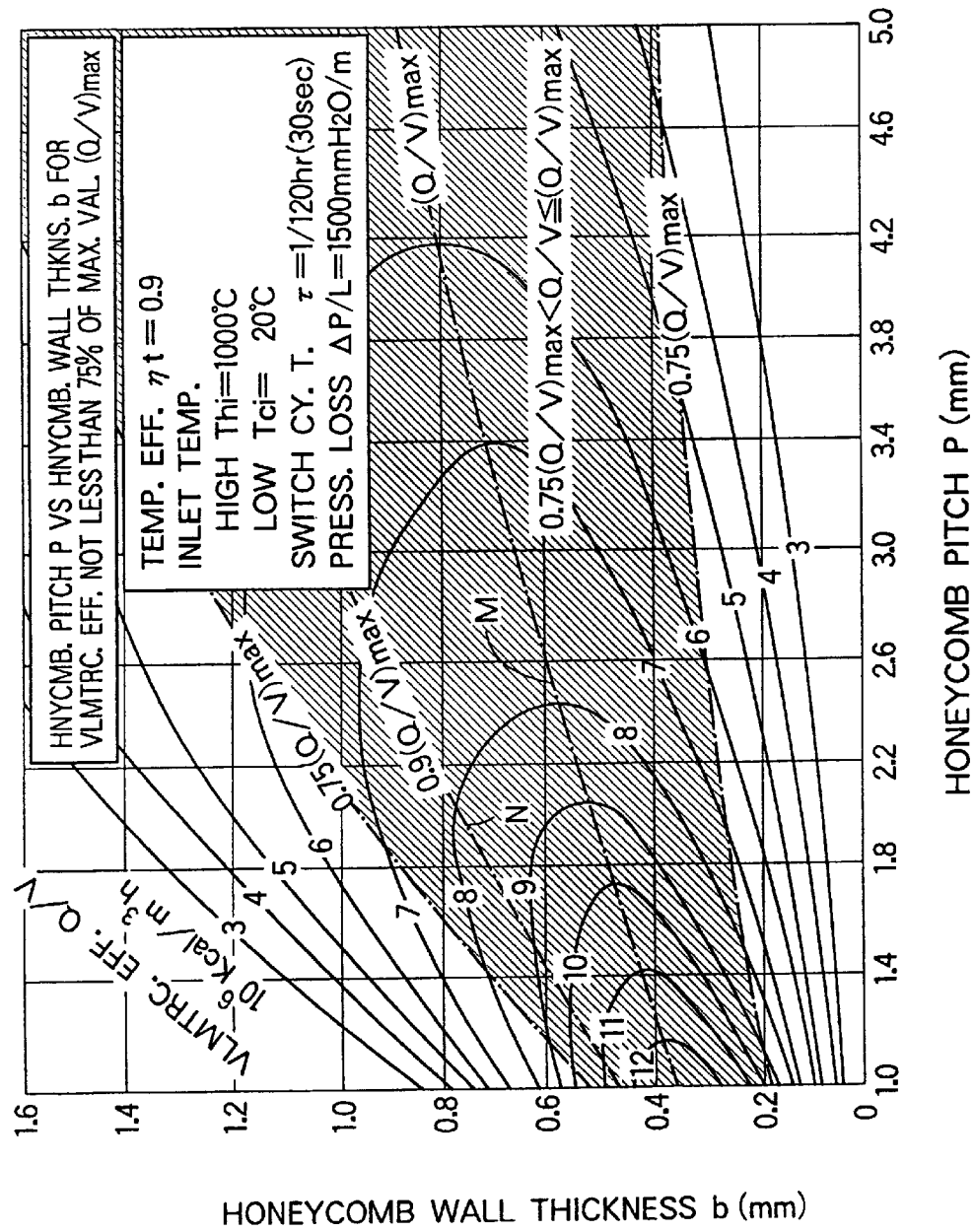
Figure 11:
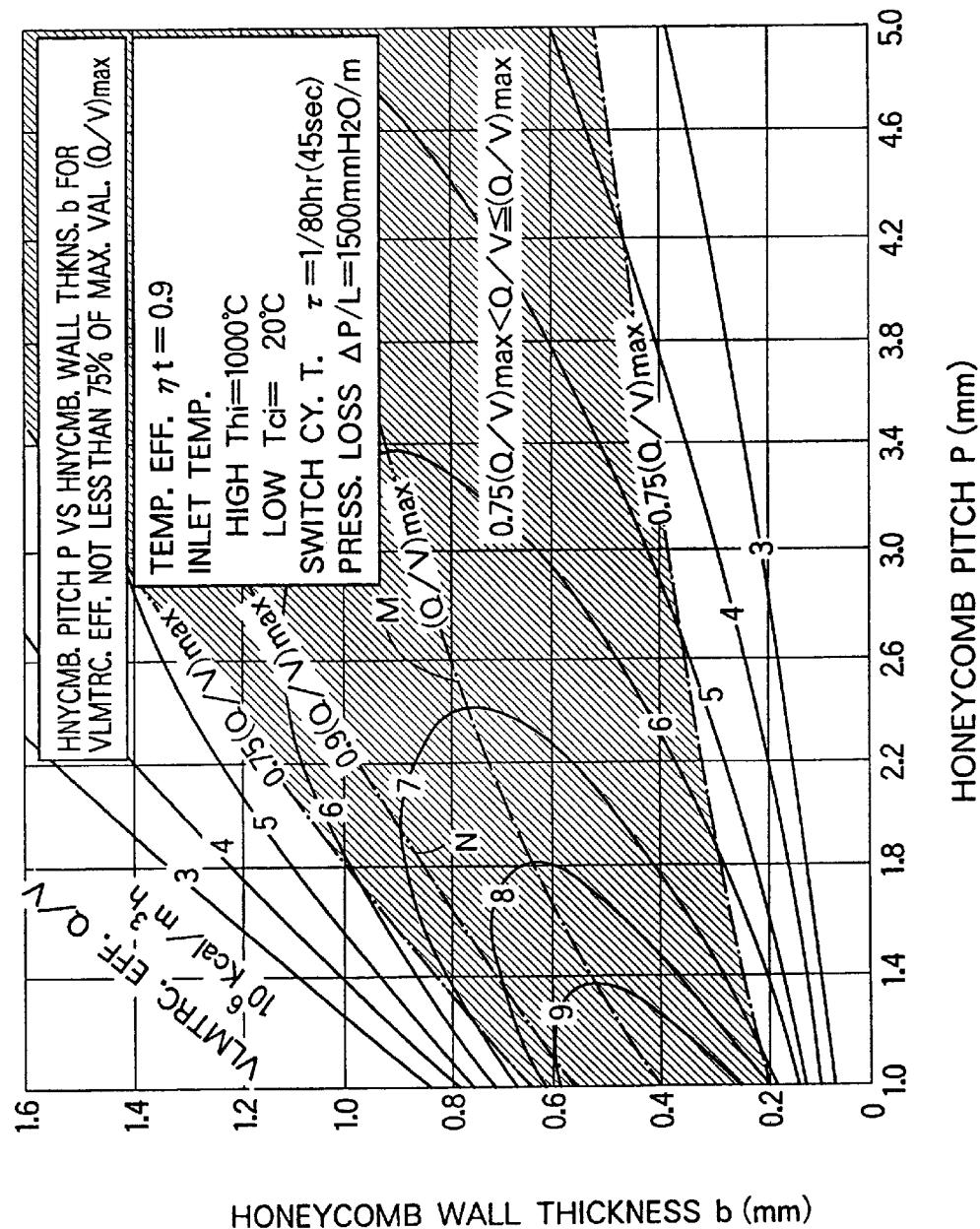
Figure 12:
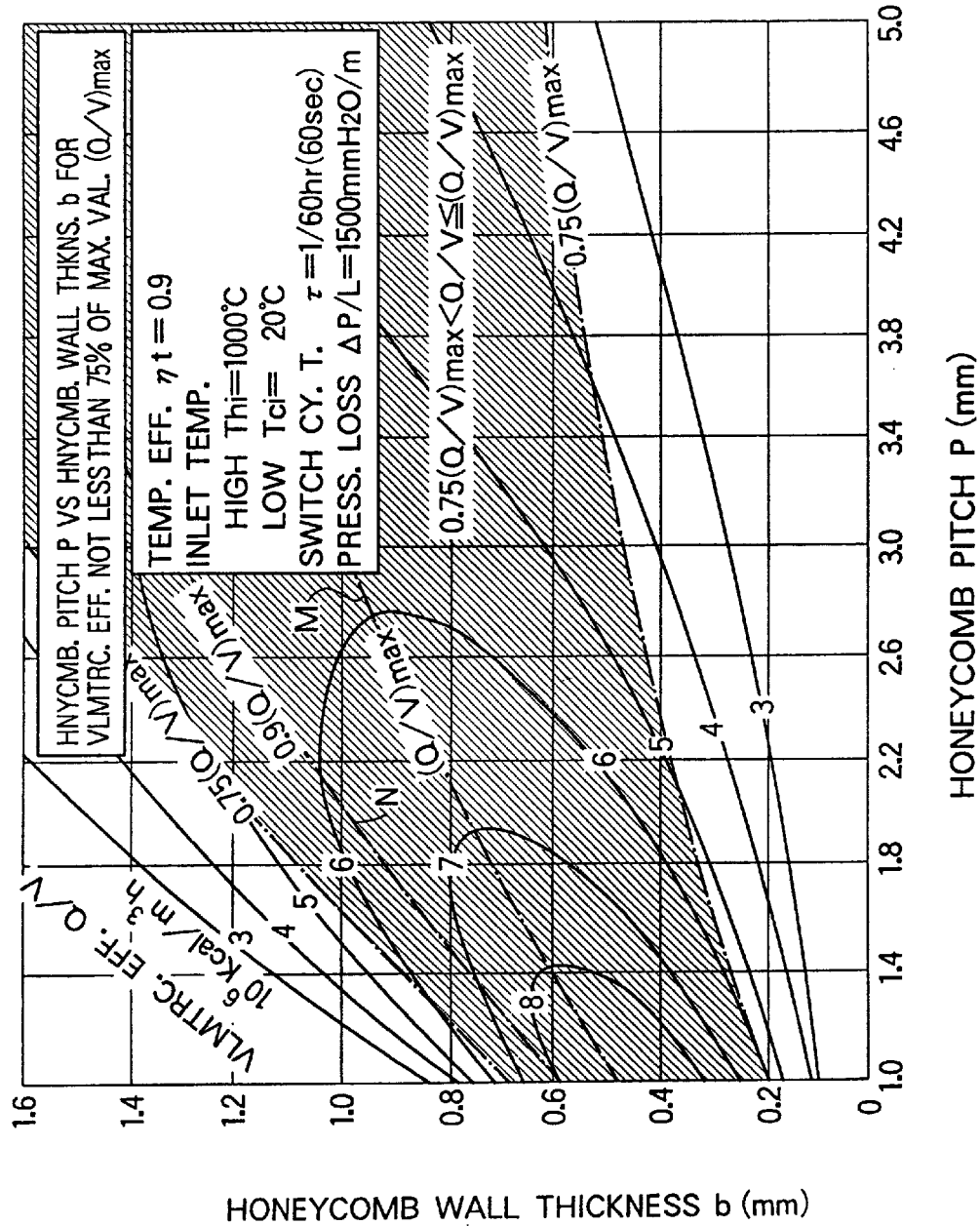

FIG. 9 shows the above-mentioned contour lines as obtained when the switching cycle time τ of the four-way valve 3 is set to be 15 seconds. FIGS. 10, 11 and 12 respectively show the contour lines as obtained when the switching cycle time τ is set to be 30 seconds, 45 seconds and 60 seconds, respectively.

A maximum volumetric efficiency curve M, which is similar to that shown in each of FIGS. 5 to 8, is shown in each of FIGS. 9 to 12 by a phantom line. As can be seen therefrom, the maximum volumetric efficiency curve M is positioned along a ridge of the contour lines, and the coordinate values on the maximum volumetric efficiency curve M indicate the values of the honeycomb pitch P (X-axis) and the values of the honeycomb wall thickness b (Y-axis), which can provide the maximum volumetric efficiency (Q/V)max. In each of FIGS. 9 to 12, the hatched area shows the region of coordinate values which correspond to values of the volumetric efficiency not less than 75% of the maximum value (Q/V)max. The honeycomb pitch P and the honeycomb wall thickness b within the hatched area can suitably be adopted as a combination of the pitch P and the wall thickness b which can provide light-weight and compact construction of each of the first and second heat exchanger units 11, 12. The values shown in FIGS. 9 to 12 have been obtained with the temperature efficiency ηt set to be 0.9.

In each of FIGS. 9 to 12, an upper limit curve N is indicated by a phantom line, which defines a preferable upper limit of the honeycomb wall thickness b to demarcate the preferred ranges of the honeycomb pitch P and the honeycomb wall thickness b. More specifically, the upper limit curve N indicates the upper limit of the region which can provide values of the volumetric efficiency (Q/V) not less than 90% of the maximum value (Q/V)max. The coordinate values, i.e., the values of the honeycomb pitch P and the honeycomb wall thickness b below the upper limit line N in the hatched area, can advantageously be used as the values of the pitch P and the thickness b of the cell walls 15 which can provide further reduction in the weight of the first and second heat exchanger units 11, 12.

Figure 13:
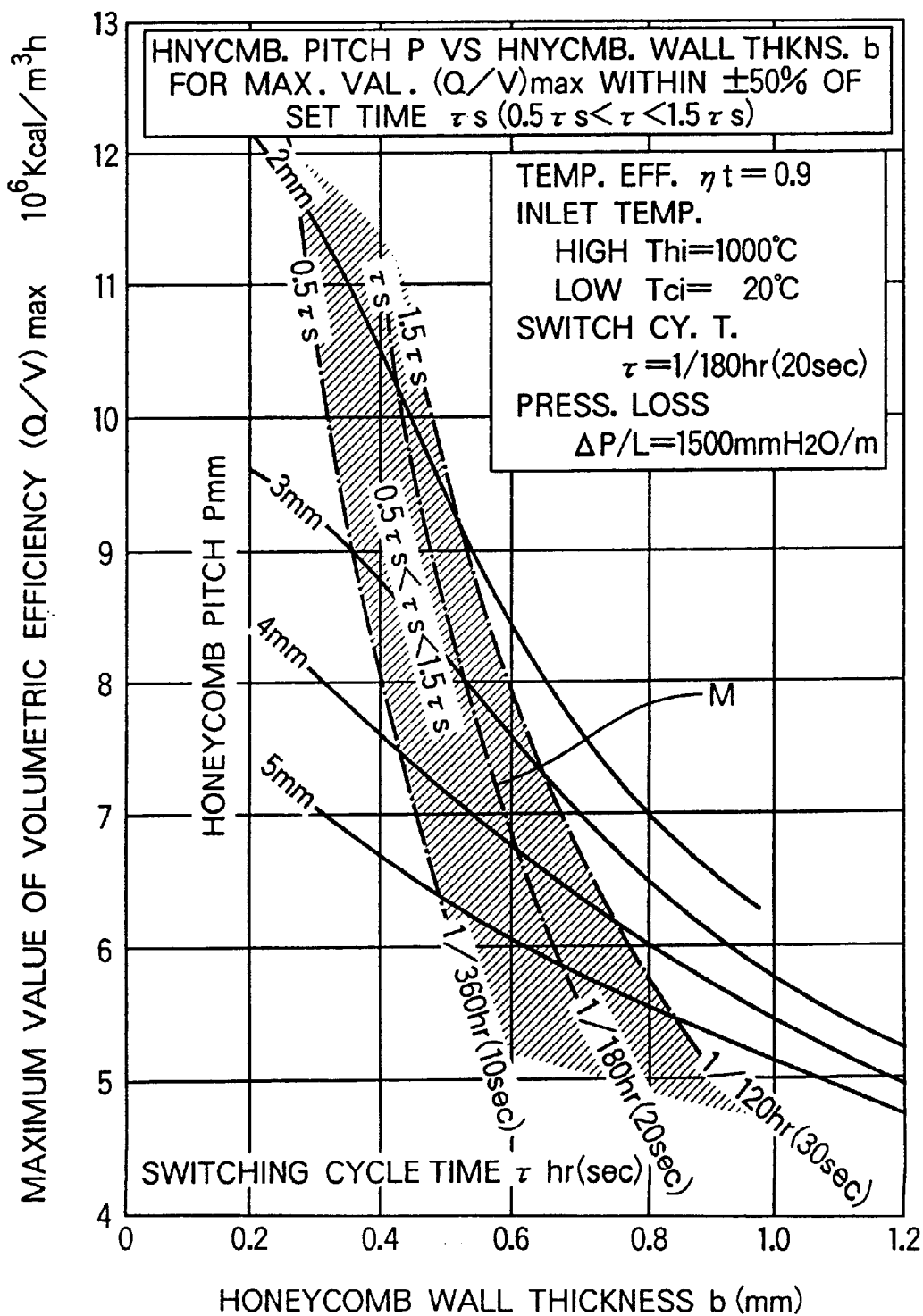
FIGS. 13 to 16 are diagrams showing variations of the volumetric efficiency peak curve as obtained when the switching cycle time of the four-way valve is varied within the range of ±50% of a preset cycle time of 20 seconds, 30 seconds, 40 seconds and 60 seconds in the equations (1) to (4), respectively.
Figure 14:
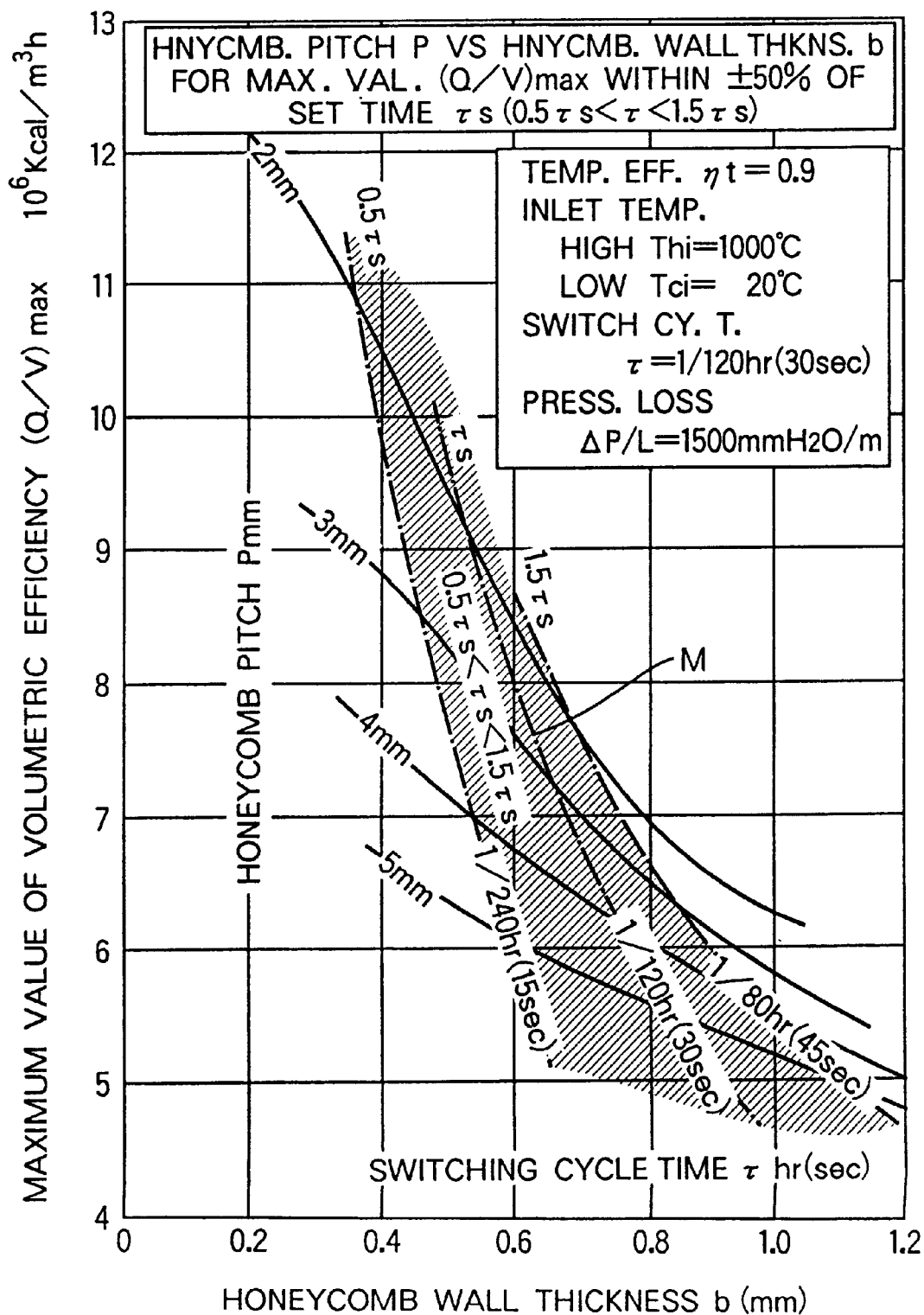
Figure 15:
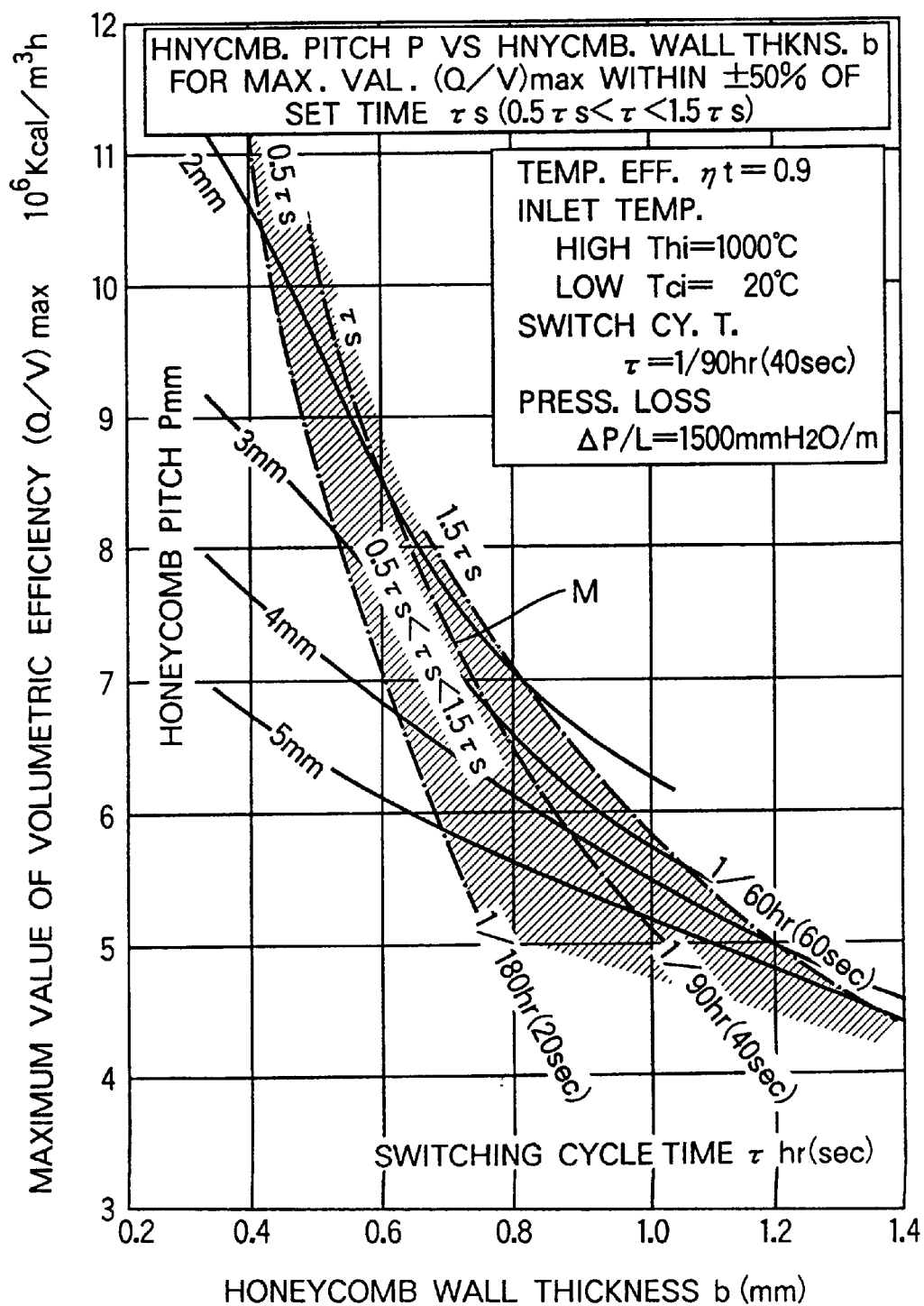
Figure 16:
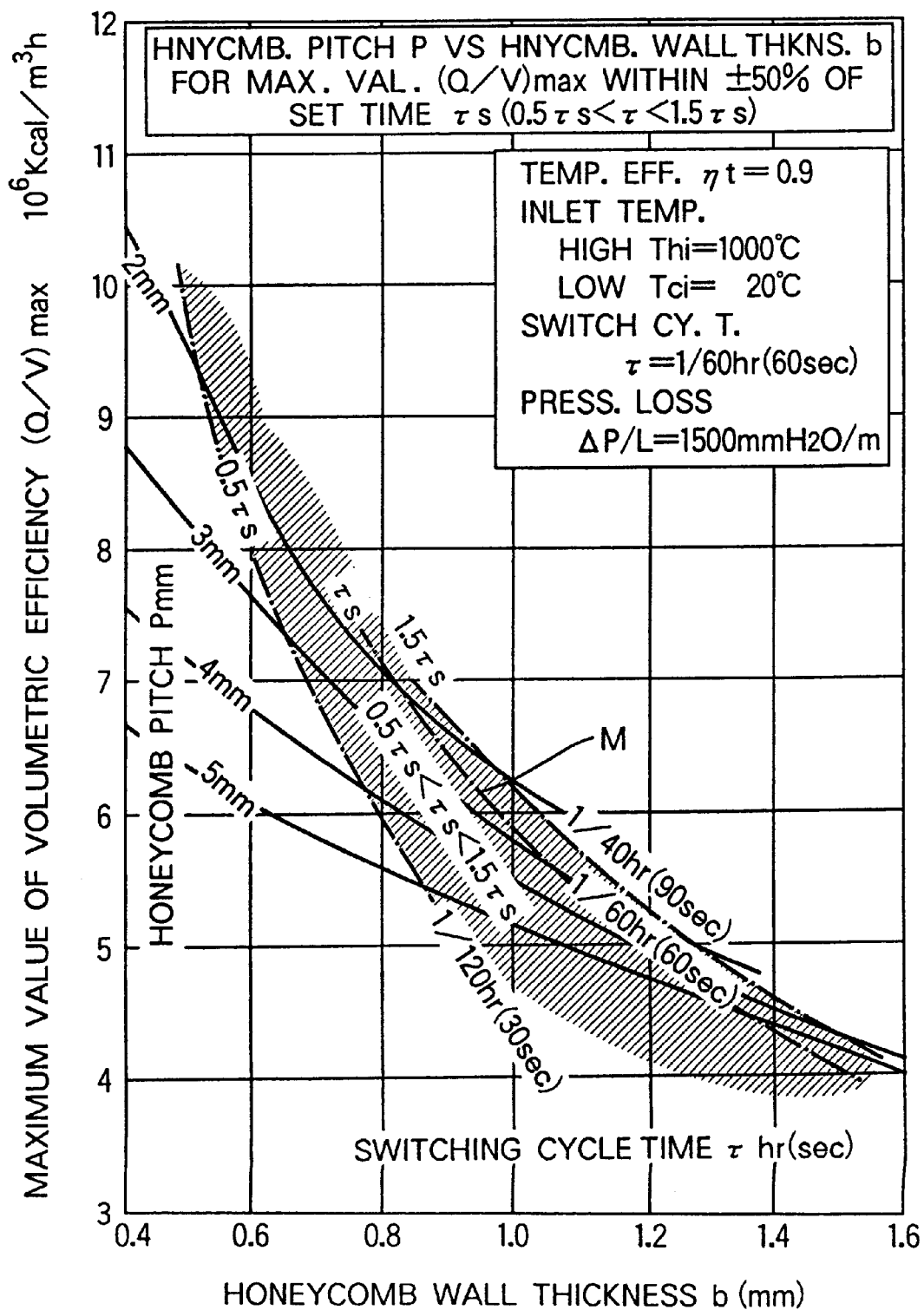
Figure 17:
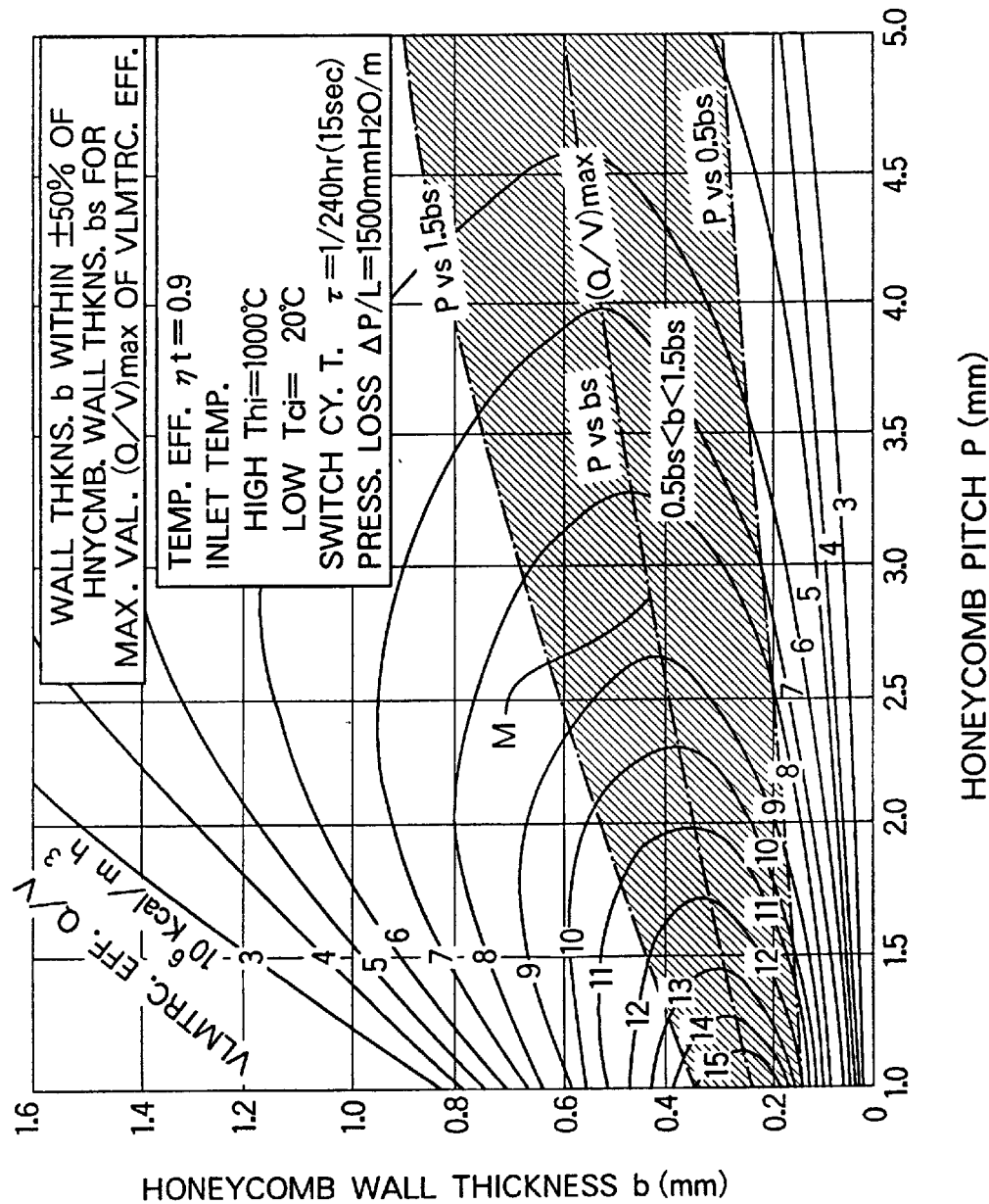
FIGS. 17 to 20 are diagrams showing the relationships between the honeycomb pitch and the honeycomb wall thickness in the first and second heat exchangers as calculated in accordance with the equations (1) to (4), with the switching cycle time of the four-way valve set to be 15 seconds, 30 seconds, 45 seconds and 60 seconds respectively, wherein the hatched area shows the region of the honeycomb wall thickness and the honeycomb pitch as obtained when the honeycomb wall thickness is varied within the range of ±50%.
Figure 18:
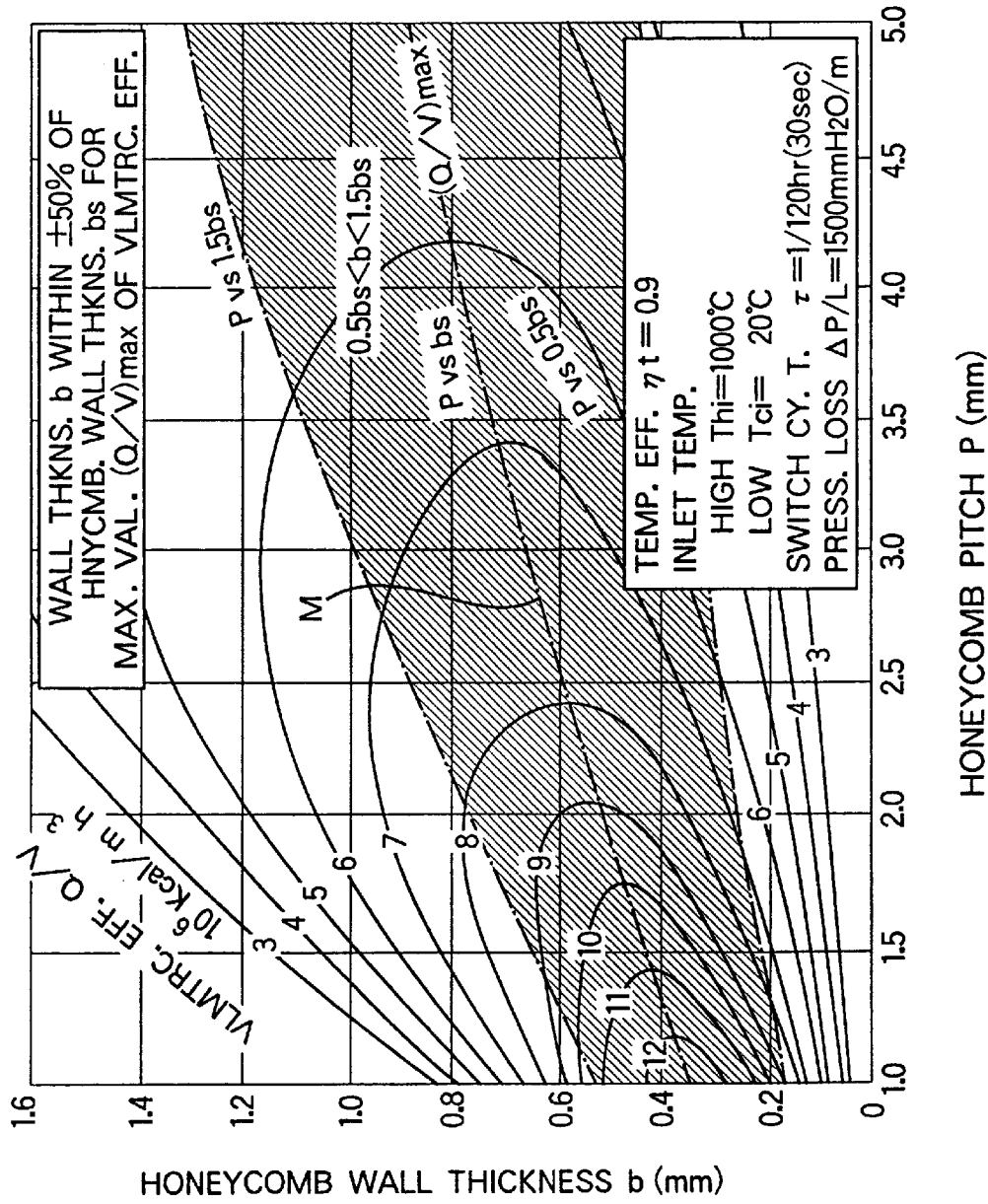
Figure 19:
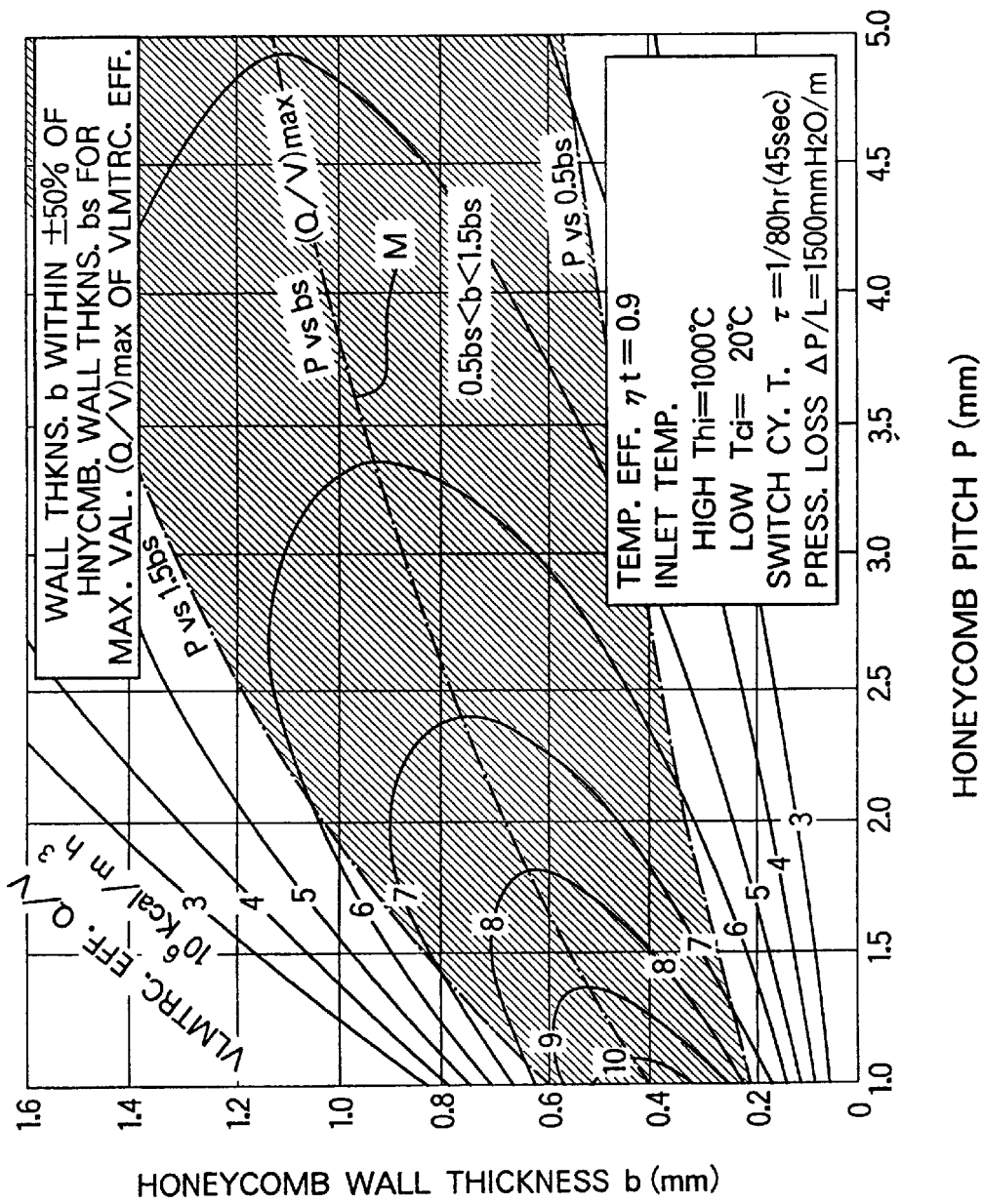
Figure 20:
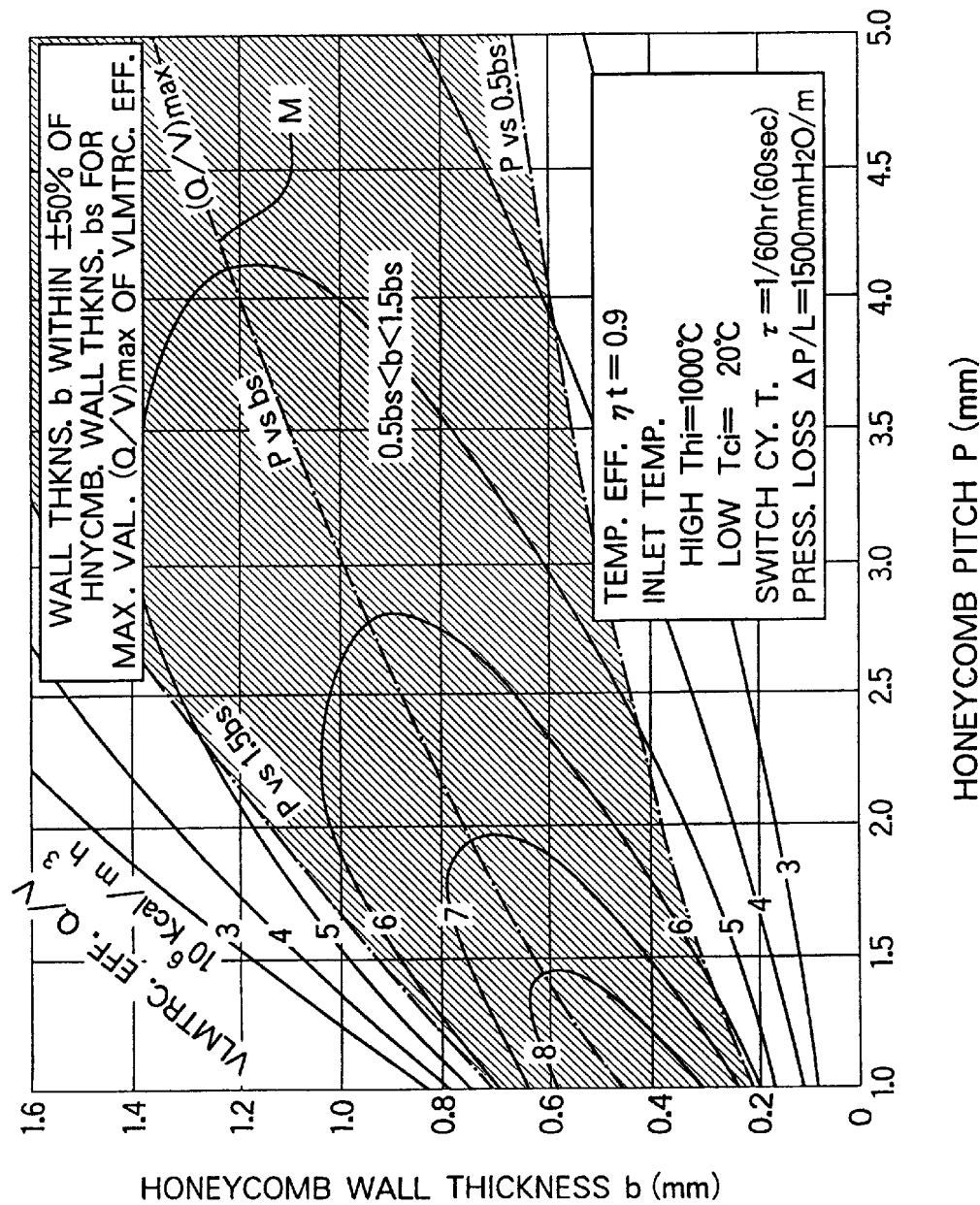

FIGS. 13 to 16 are graphic diagrams showing the change or shift of the above-mentioned maximum volumetric efficiency curve M, which occurs when the switching cycle time of the four-way valve 3 is varied within the range of ±50% of the preset time τ in the equations (1) to (4). More specifically, FIG. 13 shows the manner of variation in which the maximum volumetric efficiency curve is shifted by the change of cycle time, based on the maximum volumetric efficiency curve M obtained when the preset switching cycle time τ is 20 seconds. Similarly, FIGS. 14, 15 and 16 show the manners of variation of the maximum volumetric efficiency curves based on the curves M which are obtained when the preset switching cycle time τ is 30 seconds, 40 seconds and 60 seconds, respectively. In the X-Y coordinate system of each of FIGS. 13 to 16, the X-axis represents the values of the honeycomb wall thickness b, and the Y-axis indicates the maximum values (Q/V)max of the volumetric efficiency (Q/V). Each of FIGS. 13 to 16 also shows, by way of example, function curves representing the functional relationships between the maximum value (Q/V)max of the volumetric efficiency and the honeycomb wall thickness b, which functions are obtained by varying the switching cycle time τ when honeycomb pitch values P are preset to 5 mm, 4 mm, 3 mm and 2 mm respectively. The values shown in these Figures have been obtained on an assumption that the temperature efficiency ηt has been set to be 0.9.

In each of FIGS. 13 to 16, the hatched area shows the region over which the maximum volumetric efficiency curve M is shifted when the switching cycle time τ, which is preset to, e.g., 20 seconds in the case of FIG. 13, is varied within the range of ±50% of a predetermined time τ, e.g., the range between 10 seconds and 30 seconds. The X-coordinate values (honeycomb wall thickness values b) falling within this hatched area and relating to a given value of the honeycomb pitch P can suitably be used as the thickness b of the cell wall, which can provide appropriate values of the volumetric efficiency (Q/V) while permitting variation, change or error in the switching cycle time τ.

FIGS. 17 to 20 are graphic diagrams similar to those in FIGS. 9 to 12. Each of these Figures shows the contour lines of the volumetric efficiency (Q/V) and the maximum volumetric efficiency curve M along a ridge of the contour lines. In each of these Figures, the hatched area shows a region of values of the honeycomb wall thickness b and the honeycomb pitch P which are obtained when the Y-coordinate value (i.e., the honeycomb wall thickness b) on the maximum volumetric efficiency curve M is varied within the range of ±50%. The values of the honeycomb pitch P and the honeycomb wall thickness b falling within the hatched area can suitably be used as the values of the pitch P and the thickness b of the cell walls 15 which can provide light-weight and compact construction of each of the heat exchanger units 11, 12.

Figure 21:
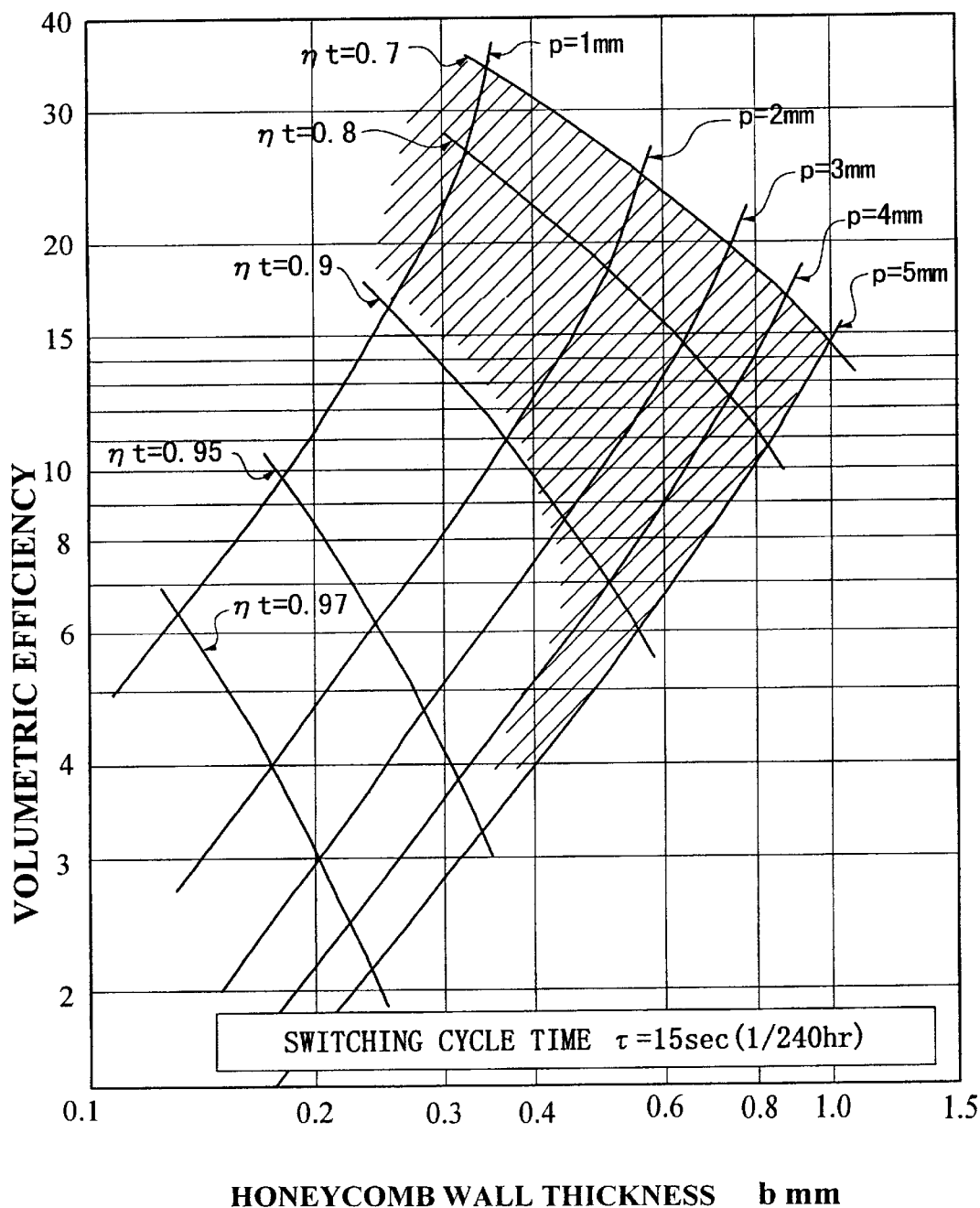
FIGS. 21 to 23 are graphic diagrams showing the region of the temperature efficiency $\eta t$ as calculated in accordance with the equations (1) to (4), with the switching cycle time of the four-way valve set to be 15 seconds, 30 seconds and 60 seconds respectively.
Figure 22:
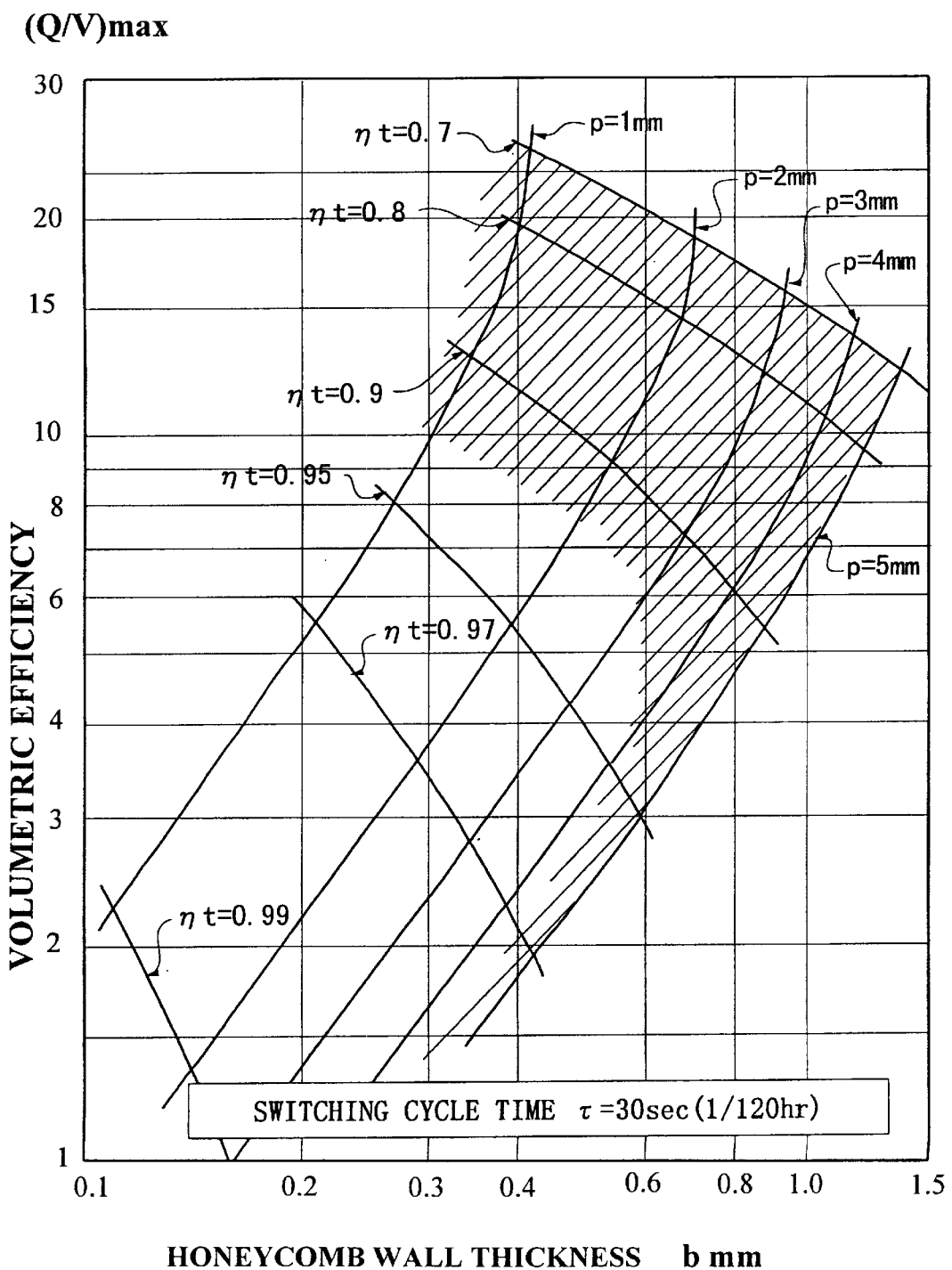
Figure 23:
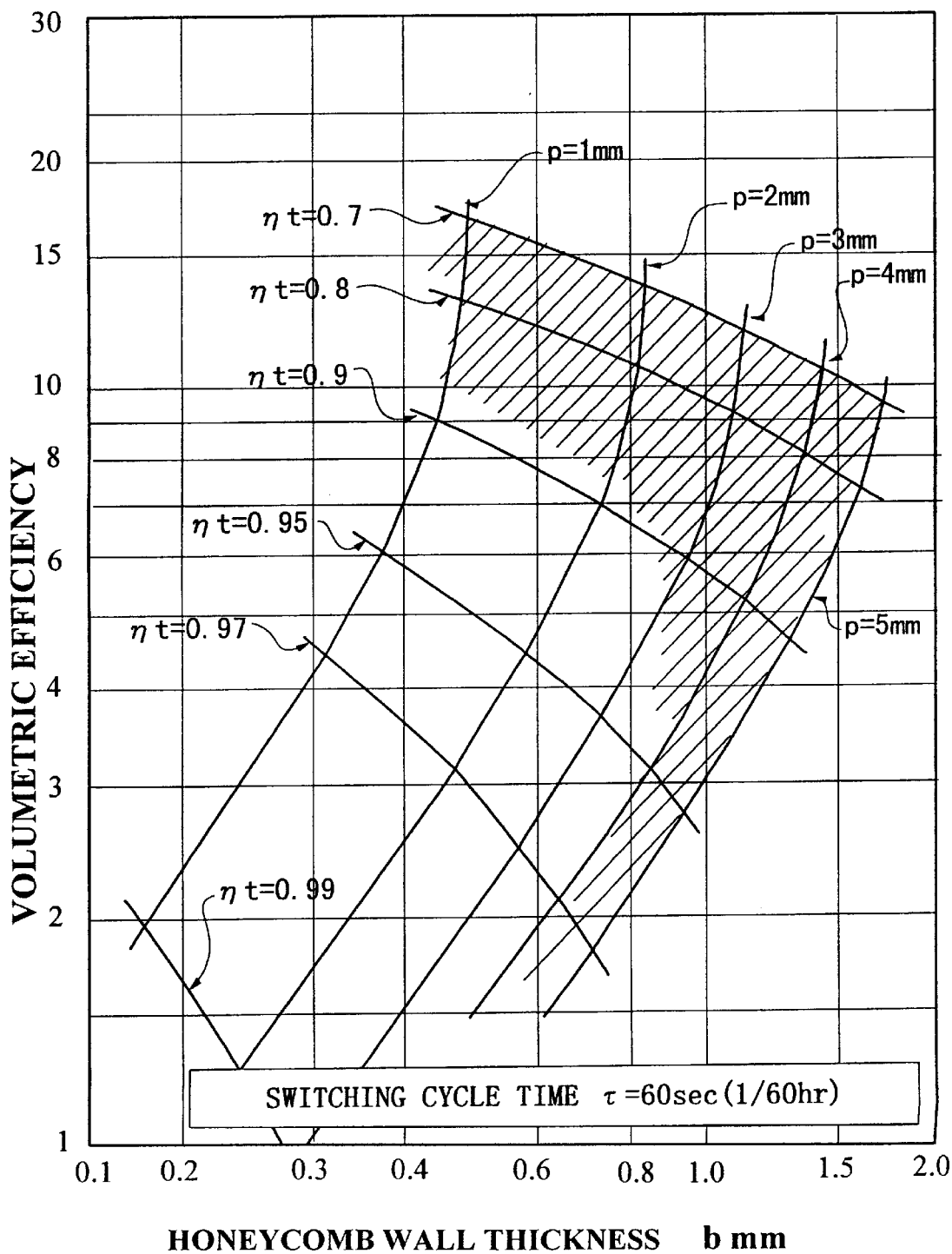
Figure 24A:
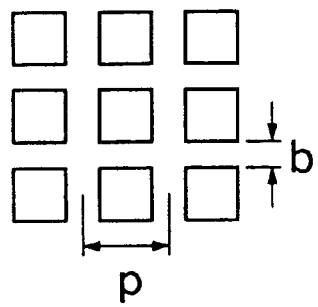
FIGS. 24(a) through 24(h) are schematic cross-sectional views of a heat exchanger, illustrative of various types of honeycomb structure.
Figure 24B:
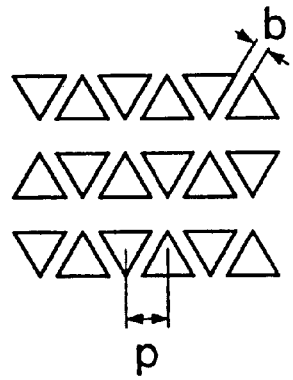
Figure 24C:
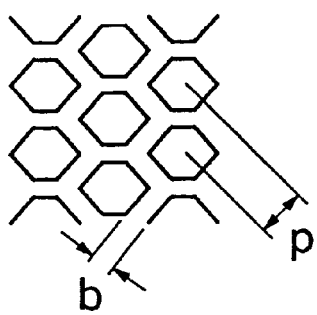
Figure 24D:
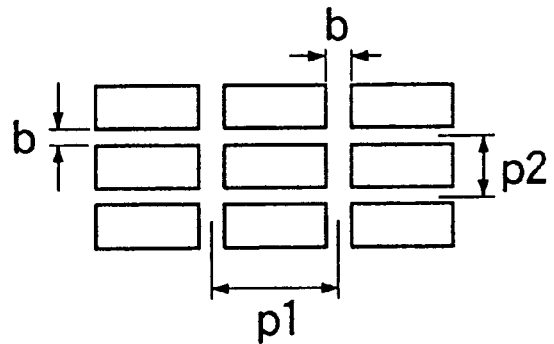
Figure 24E:
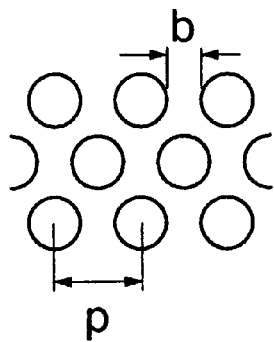
Figure 24F:
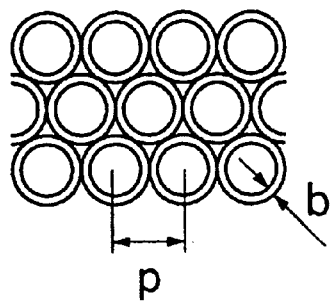
Figure 24G:
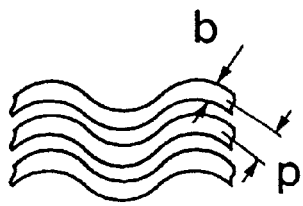
Figure 24H:

FIGS. 21 to 23 are graphic diagrams showing the region of the temperature efficiency ηt calculated by the aforementioned equations (1) to (4). FIG. 21 indicates the region of the temperature efficiency ηt≧0.7 which can be attained under the condition that the switching cycle time τ of the four-way valve 3 is set to be 15 seconds, and FIGS. 22 and 23 indicate the regions of the temperature efficiency ηt≧0.7 which can be obtained under the conditions of 30 seconds and 60 seconds in the switching cycle time τ, respectively. The Y-axis in each of FIGS. 21 to 23 indicates the absolute value of the maximum value (Q/V) max of the volumetric efficiency (Q/V). It should be noted that the volumetric efficiency (Q/V) is an indication for relatively evaluating the overall volume and the heat transmission ability of the regenerator under the respective conditions of the honeycomb pitch P and the wall thickness b, and that the magnitude of the absolute value of the maximum volumetric efficiency (Q/V) max has no significant meaning in itself. In FIGS. 21 to 23, the relation between the honeycomb wall thickness b and the temperature efficiency ηt is indicated, which is attained in a case where the honeycomb pitch P is stepwisely set to be 5 mm, 4 mm, 3 mm, 2 mm, and 1 mm, respectively. Further, the hatched area indicates in each of the diagrams the region of honeycomb pitch P and the wall thickness b for realizing the temperature efficiency ηt≧0.7.

As can be understood from the foregoing description, the high-cycle regenerative combustion system 1 of the described embodiment of the present invention incorporates the first and second regenerative heat exchanger units 11, 12, which are alternately put into operation by means of the four-way valve 3, and the valve 3 is shifted at a predetermined switching cycle time not longer than 60 seconds. Each of the regenerative heat exchanger units 11, 12 has a void ratio ε, which is determined so as to result in the maximum value (Q/V)max of the volumetric efficiency (Q/V) in the prescribed equations (1) to (4).

Further, the temperature efficiency ηt is set to a value ranging between 0.7 and 1.0, e.g., to 0.9, while the inlet temperature (Tci) of the combustion air (i.e., low temperature fluid) and the inlet temperature (Thi) of the exhaust gas (i.e., the high temperature fluid) are respectively set to be e.g., 20° C. and 1,000° C. The temperature efficiency ηt is computed in accordance with the equation (2) as the function of the heat transmission coefficient h, the heat transmission area A and the switching cycle time τ. The values of the heat transmission coefficient h and the heat transmission area A are so determined that the temperature efficiency ηt falls within the above-mentioned predetermined value between 0.7 and 1.0. Thus, each of the heat exchanger units 11, 12 has the values of the pitch P and the thickness b of the cell wall 15 which substantially correspond to the above-mentioned values of the void ratio ε, the heat transmission coefficient h and the heat transmission area A. In the heat exchanger units 11, 12 of such construction, the pitch P and the thickness b of the cell walls 15 substantially correspond to the maximum value (Q/V)max of the volumetric efficiency (Q/V), so as to provide the desired high heat transmission rate while minimizing the overall volume of the heat exchanger unit. Further, such values of the pitch P and the thickness b of the cell walls 15 achieve the value of the temperature efficiency ηt falling within the range of between 0.7 and 1.0, thus meeting the requirement for high temperature efficiency essential in a high-cycle regenerative combustion system.

Still further, in the embodiment as described above, the pitch P and the thickness b of the cell walls 15 are preferably determined so as to provide a volumetric efficiency (Q/V) which is not less than 75% of the maximum value (Q/V)max calculated under specific or predetermined conditions. By using such values of the pitch P and thickness b of the cell walls 15, it is possible to design a light-weight and compact heat exchanger unit 11, 12 while maintaining the volumetric efficiency (Q/V) at a desired level. More preferably, the upper limit of the thickness b of the cell walls 15 is set to be a value which can provide a volumetric efficiency (Q/V) not less than 90% of the maximum value (Q/V)max. By keeping such an upper limit of the cell wall thickness b, it is possible to further reduce the weight of the first and second heat exchanger units 11, 12.

From another aspect of the embodiment described hereinbefore, the pitch P and the thickness b of the cell walls 15 of the first and second heat exchanger units 11, 12 are preferably determined so as to correspond to the maximum value (Q/V)max of the volumetric efficiency (Q/V) obtainable when the switching cycle time τ of the four-way valve 3 is varied in the equations (1) to (4) within the range of ±50% of the preset value. Using such values of the pitch P and the thickness b of the cell walls 15, a variation, change or error in the switching cycle time τ is permitted to some extent while ensuring the suitable volumetric efficiency (Q/V).

From still another aspect of the above embodiment, each of the first and second heat exchanger units 11, 12 can have a thickness b of the cell walls 15 so that it falls within the range of ±50% of the cell wall thickness b which can provides the maximum value (Q/V)max of the volumetric efficiency (Q/V) calculated under specific conditions. With such a value of the cell wall thickness b, a light-weight and compact heat exchanger unit 11, 12 can be designed while a suitable value of the volumetric efficiency (Q/V) is ensured.

The term "honeycomb structure" is used to generally means structures in which a plurality of passages or channels are arranged in a honeycomb-like form. The constructions or arrangements of the heat accumulators used in the first and second heat exchanger units 11, 12 are therefore not limited to the above described honeycomb structure, but various other honeycomb structures can be equally applied. FIGS. 24(*a*) through 24(*h*) show alternative forms of the honeycomb structure usable in the present invention. It can be readily understood from FIGS. 24(*a*) through 24(*h*) that the flow channel in the honeycomb structure may have a circular, triangular, square, rectangular or hexagonal cross-section, or the like. The honeycomb structure also may be built up by assembling tubes of circular cross-section, plates, and so forth. In FIG. 24, the honeycomb pitch P and the honeycomb wall thickness b in each form of the honeycomb structures are indicated. It would be clear to those skilled in the art that the equations for determining the void ratio ε and the ratio A/Gm is appropriately modified or changed in accordance with the variation in the form of the honeycomb structure.

Figure 25:
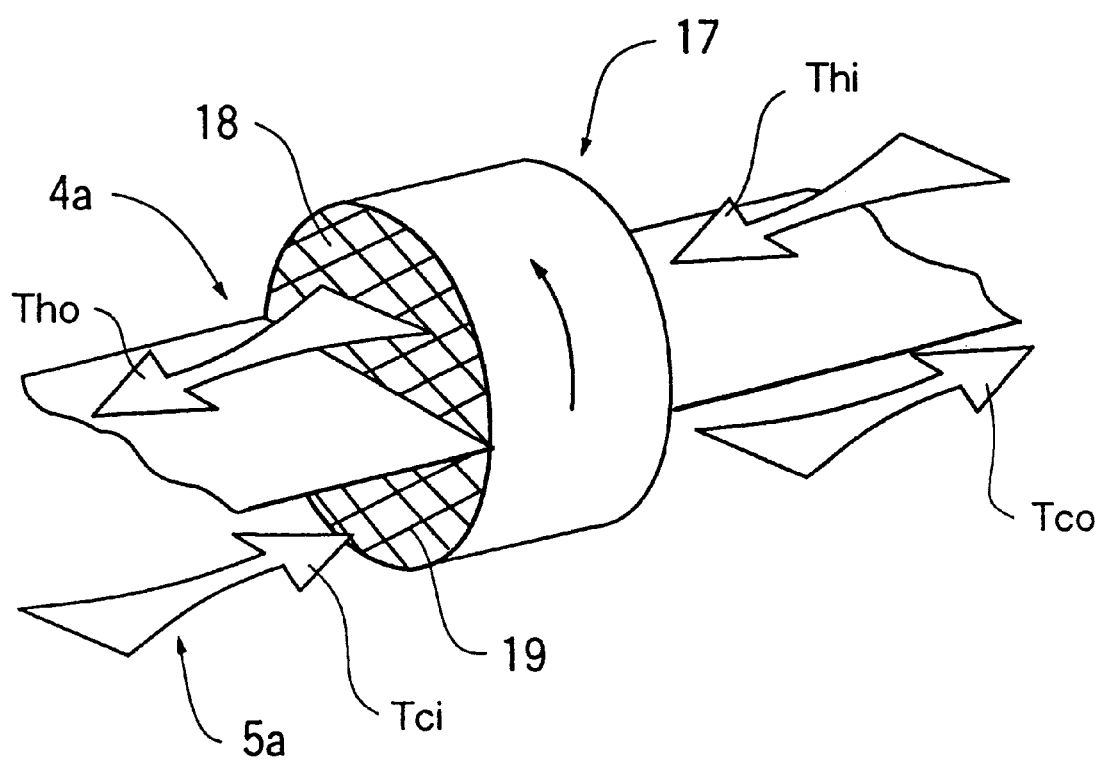
FIG. 25 is a perspective view of a regenerative heat exchanger of a rotary type.

The combustion system of the above described embodiment is so constructed that the flow passages 4, 5, as well as the burners 21, 22, are alternately switched while the first and second heat exchanger units 11, 12 are stationary at the predetermined positions. It is to be understood, however, that the present invention can equally be applied to a rotary type of regenerative heat exchanger unit in which a heat exchanger itself is rotated whereas operation of the flow passages and the burners are substantially constant. FIG. 25 illustrates an example of a rotary type of regenerative heat exchanger. Referring to FIG. 25, a rotary heat exchanger 17 has a lattice-like honeycomb structure having a plurality of flow passages or channels 18 defined by cell walls 19. The heat exchanger 17 is rotationally driven in the direction of the arrow by a driving device (not shown) in such a manner that a portion, which is located in a passage 5*a* for a low temperature fluid (e.g., combustion air) and a portion positioned in a passage 4*a* of a high temperature fluid (e.g., the exhaust gas) are alternately and periodically replaced with each other. The rotary heat exchanger 17 of this type can perform substantially the same function as the combination of the heat exchanger units 11, 12 in the preceding embodiment, and the pitch and the thickness of the cell walls 19 of the heat exchanger 17 can be determined substantially in the same manner as the determination or calculation of the pitch P and the thickness b of the cell walls 15 in the above heat exchanger units 11, 12.

Although the above described embodiment employs the four-way valve 3 as the means for switching the fluid flow passages, other type of switching means, such as case-switching type high-speed switching system having a so-called Cross Exchange Mechanism (CEM), which is disclosed in the specification of Japanese Patent Application No. 4-216743 of the present applicant, may be used as the means for switching the fluid passages.

As can be understood from what have been described above, the present invention provides a combustion method in which the combustion air passing through the regenerator 11,12 is preheated up to a extremely high temperature range exceeding 700° C. and reaching 800° C., preferably a temperature range exceeding 900° C. and reaching 950° C., and thereafter, the preheated combustion air flows into the fuel delivery area 25 through the restriction 26. The high temperature combustion air flow in the fuel delivery area 25 of a relatively small diameter is increased in its flow velocity in accordance with reduction of the flow passage area, and is mixed with the hydrocarbon fuel supplied by the delivery ports of the first and second burners 21, 22. The combustion reaction of the combustion air and the fuel is generated and maintained by self-ignition action under the high temperature atmosphere above the self-ignition temperature of the hydrocarbon fuel and, if desired, by means of an ignition of an auxiliary pilot burner, so that a combustion flame is continuously formed and kept in force in the inside furnace area 30.

While the present invention has thus been shown and described in connection with the particular preferred embodiments, it is apparent that certain changes and modifications, in addition to those mentioned above, may be made by those skilled in the art without departing from the basic features of the present invention. Accordingly, it should be noted that the present invention is in no way limited to the details of the described arrangements.

What is claimed is:

1. A combustion method in an industrial combustion system in which a low temperature fluid including a combustion air to be fed to a combustion zone of said combustion system is preheated through a high-cycle regenerative combustion system to produce a preheated fluid, and the preheated fluid is introduced into the combustion zone to generate and maintain a combustion reaction therein, comprising the steps of:

provide a high-cycle regenerative combustion system including a regenerator having a honeycomb structure with honeycomb walls defining a plurality of fluid passages, wherein either of said low temperature fluid and a high temperature fluid including an exhaust gas generated in said combustion zone and directly introduced into the regenerator, either of said low temperature fluid and said high temperature fluid is adapted to selectively flow through the fluid passages, and said high-cycle regenerative combustion system has a switching cycle time so that said regenerator is alternately in heat transferable contact with the low temperature fluid and the high temperature fluid so as to perform heat exchange between said low temperature fluid and said high temperature fluid therethrough, said switching cycle time being set to be 60 seconds at the longest;

providing said regenerator with a temperature efficiency greater than or equal to 0.7 so as to accumulate heat of said high temperature fluid and transfer the heat thus accumulated in the regenerator to said low temperature fluid;

preheating the low temperature fluid by the heat exchange between the low temperature fluid and the high temperature fluid through the regenerator in accordance with said temperature efficiency, thereby the low temperature fluid being continuously preheated up to a temperature range above 800° C. by means of the regenerator; and continuously introducing the fluid preheated by the regenerator to the temperature higher than 800° C. into the combustion zone through the regenerator and feeding a combustion fuel to a flow of said fluid preheated to the temperature higher than 800° C., so that a combustion reaction is generated and maintained in the combustion zone by said fluid flow and said combustion fuel.

2. A combustion method according to claim 1, wherein a thickness of said honeycomb wall is set to be less than or equal to 1.6 mm and a pitch of the honeycomb walls is set to be less than or equal to 5.0 mm.

3. A combustion method according to claim 1, wherein said temperature efficiency has a range greater than or equal to 0.9.

4. A combustion method according to claim 3, wherein said low temperature fluid is preheated up to a temperature range above 950° C. by means of said regenerator so as to generate and maintain the combustion reaction in the combustion zone with use of said fluid flow of the temperature above 950° C. and said combustion fuel.

5. A combustion method according to claim 1, wherein a volumetric efficiency of said regenerator (Q/V), which is defined as a heat transmission rate of the regenerator (Q) per a whole volume of the regenerator (V), is set to substantially exhibit a maximum value.

6. A combustion method according to claim 1, wherein restriction means for restricting said flow passages of said preheated fluid flow is provided between said regenerator and said combustion zone so as to increase a flow velocity of said preheated fluid flow, whereby the combustion reaction is generated and maintained in the preheated fluid flow at the high velocity.

7. A combustion method according to claim 6, wherein the flow velocity of said preheated fluid flow is increased up to a flow velocity greater than 80 meters per second (m/s).

8. A combustion method in an industrial combustion system in which a combustion air to be fed to a combustion device is preheated through a high-cycle regenerative combustion system to produce preheated combustion air and the preheated combustion air is introduced into a combustion zone in which a combustion reaction is generated and maintained by the preheated combustion air, comprising the steps of:

providing a high-cycle regenerative combustion system including a pair of regenerators of honeycomb structure having honeycomb walls and a plurality of fluid passages defined by the honeycomb walls, either of the combustion air and a combustion exhaust gas is allowed to selectively flow through the fluid passages, and a switching cycle time of the combustion system is set to be 60 seconds at the longest;

alternately flowing the combustion air of a low temperature to be fed to the combustion zone in the combustion system and the combustion exhaust gas emitted from the combustion zone through the fluid passages in accord with said switching cycle time so as to effect heat transmission to the honeycomb walls, the combustion exhaust gas being directly introduced into the regenerator and heating the regenerator, and the combustion air cooling the regenerator, so that the combustion air is preheated by the exhaust gas through a heat exchange action of the honeycomb walls;

providing the regenerator with a temperature efficiency having a value not less than 0.7;

effecting heat exchange between the exhaust gas and the combustion air with the regenerator in said temperature efficiency so that the combustion air is heated up to an extremely high temperature higher than 800° C. by means of the exhaust gas through the regenerator, and a flow of the combustion air thus heated to 800° C. or higher is introduced into the combustion zone; and feeding a combustion fuel to the high temperature combustion air flow, so that a combustion reaction is continuously generated and maintained in the combustion zone by the fuel and the combustion air heated to the temperature higher than 800° C.

9. A combustion method according to claim 8, wherein a thickness of said honeycomb wall is set to be less than or equal to 1.6 mm and a pitch of the honeycomb walls is set to be less than or equal to 5.0 mm.

10. A combustion method according to claim 9, wherein a thickness of said honeycomb wall is set to be less than or equal to 1.6 mm and a pitch of the honeycomb walls is set to be less than or equal to 5.0 mm, and said temperature efficiency is equal to or greater than 0.9, and wherein said low temperature fluid is preheated up to a temperature range above 950° C. by means of said regenerator so as to generate and maintain the combustion reaction in the combustion zone with use of said fluid flow of the temperature above 950° C. and said combustion fuel.

11. A combustion method according to claim 9, wherein a volumetric efficiency of said regenerator (Q/V), which is defined as a heat transmission rate of the regenerator (Q) per a whole volume of the regenerator (V), is set to substantially exhibit a maximum value.

12. A combustion method according to claim 9, wherein the combustion reaction is continuously generated in the combustion zone by a self-ignition action of the hydrocarbon fuel.

13. A combustion method according to claim 9, wherein the preheated combustion air is increased in its flow velocity by reduction of the flow passage area between said regenerator and said combustion zone, whereby the combustion reaction is generated and maintained in the preheated fluid flow at the high velocity.

* * * * *